United States Patent
Mullendore et al.

(10) Patent No.: US 7,215,680 B2
(45) Date of Patent: May 8, 2007

(54) METHOD AND APPARATUS FOR SCHEDULING PACKET FLOW ON A FIBRE CHANNEL ARBITRATED LOOP

(75) Inventors: Rodney N. Mullendore, San Jose, CA (US); Stuart F. Oberman, Sunnyvale, CA (US); Anil Mehta, Milpitas, CA (US); Keith Schakel, San Jose, CA (US); Kamran Malik, San Jose, CA (US)

(73) Assignee: Nishan Systems, Inc., San Jose, CA (US)

( * ) Notice: Subject to any disclaimer, the term of this patent is extended or adjusted under 35 U.S.C. 154(b) by 1055 days.

(21) Appl. No.: 10/144,187

(22) Filed: May 13, 2002

(65) Prior Publication Data
US 2003/0021239 A1 Jan. 30, 2003

Related U.S. Application Data

(60) Provisional application No. 60/307,926, filed on Jul. 26, 2001.

(51) Int. Cl.
*H04L 12/56* (2006.01)
(52) U.S. Cl. .................................................. 370/412
(58) Field of Classification Search ..................... None
See application file for complete search history.

(56) References Cited

U.S. PATENT DOCUMENTS

| | | | |
|---|---|---|---|
| 6,317,800 B1 | 11/2001 | Westby et al. | |
| 6,400,730 B1 * | 6/2002 | Latif et al. | 370/466 |
| 6,425,034 B1 | 7/2002 | Steinmetz et al. | |
| 6,614,796 B1 * | 9/2003 | Black et al. | 370/403 |
| 6,999,460 B1 * | 2/2006 | Fiore | 370/400 |
| 2002/0091883 A1 | 7/2002 | Beardsley et al. | |

* cited by examiner

*Primary Examiner*—Doris H. To
*Assistant Examiner*—Robert W. Wilson
(74) *Attorney, Agent, or Firm*—Hensley Kim & Edgington, LLC

(57) ABSTRACT

A system and method for enabling a network switch to transmit queued packets to a device when opened by the device, and thus to utilize the Fibre Channel Arbitrated Loop (FC-AL) in full-duplex mode when possible. The switch may include a plurality of queues each associated with a device on the FC-AL for queuing incoming packets for the device. The switch may determine a next non-empty queue, open the device associated with the queue, and send packets to the device. The device may send packets to the switch concurrently with receiving packets from the switch, thus utilizing the FC-AL in full-duplex mode. When a device opens the switch to transmit packets to the switch, the switch may determine if there are packets for the device in the queue and, if so, send packets to the device concurrently with receiving packets from the device, thus utilizing the FC-AL in full-duplex mode.

47 Claims, 19 Drawing Sheets

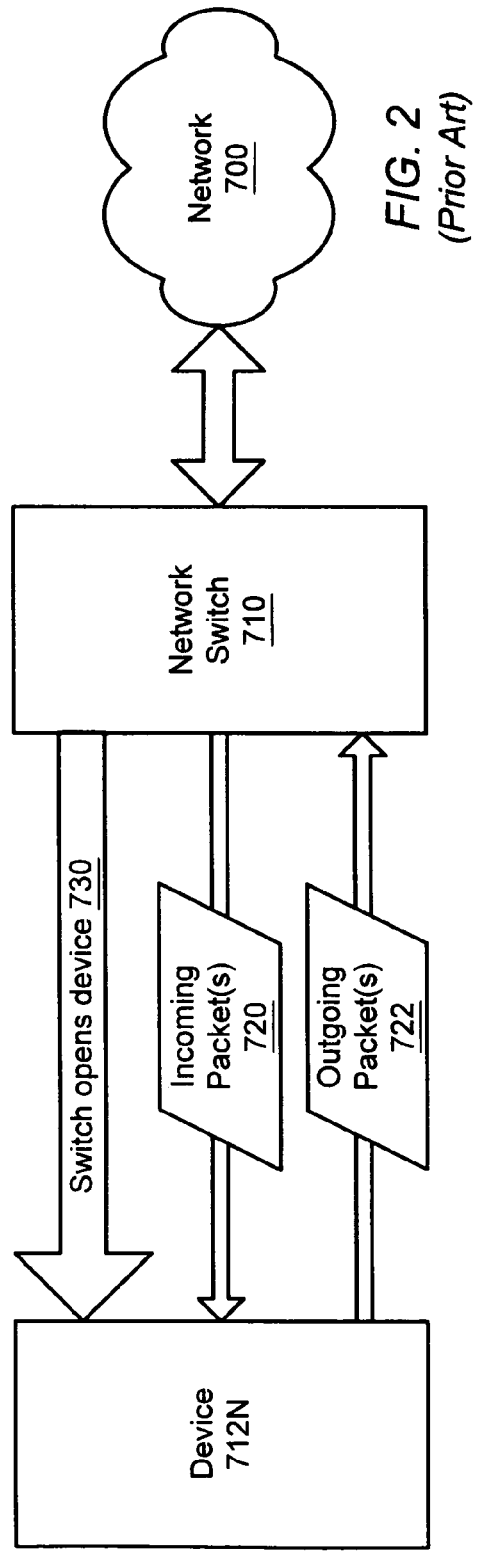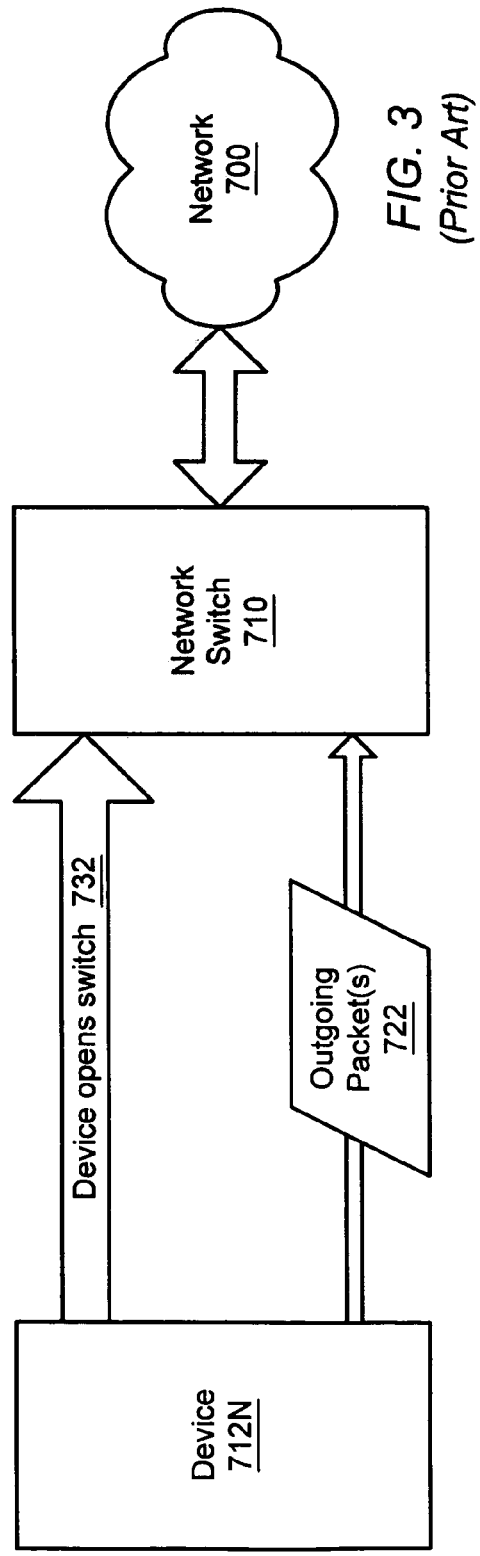

Single Queue Frame Ordering Example

← Front of queue

Single Queue Frame Ordering Example (Less Overhead)

← Front of queue

FCP_XFER_RDY IU Delayed By Switch Queuing

FC-MAC / Fabric Signal Descriptions

| Signal | Description |
| --- | --- |
| eg_ReadQueueNum[6:0] | This bus indicates the output queue that the FC-MAC wishes to read from next. |
| eg_RdReq | This signal, when asserted, indicates that the FC-MAC is requesting that the Fabric read from the queue identified by eg_ReadQueueNum. This signal will remain asserted until ob_RdAck is asserted when it will deasserted as part of the interface "handshake". This signal will not be asserted again until ob_RdAck is deasserted. |
| ob_RdAck | The fabric asserts this signal to indicate the Queue Read request has been received and the status signals (ob_RdEmpty and ob_RdLast) are valid. If a packet was available to be read from the Queue, the fabric will read the packet and output the contents to the FC-MAC. This signal is asserted until eg_RdReq is de-asserted when it will be de-asserted to complete the request "handshake". |
| ob_RdEmpty | This signal, when asserted (and ob_RdAck is asserted) indicates that the read from the requested queue could not be performed because the queue was empty. |
| ob_RdLast | This signal, when asserted (and ob_RdAck is asserted) indicates that the read from the requested queue is being performed but the frame being read was the last frame in the queue. This signal allows the FC-MAC to advance to the next queue without having to perform a read request to determine that the queue is empty. |
| eg_CurrentQueueNum[6:0] | This bus, when eg_NextReq is asserted, contains the value of the queue currently selected for scheduling by the FC-MAC (which may be different from the eg_ReadQueueNum). |
| eg_NextReq | This signal, when asserted, indicates that the FC-MAC is requesting that the Fabric return the value of the queue that should be scheduled after the queue identified by eg_CurrentQueueNum. The fabric returns the number of the next queue (in a round-robin selection) that has frames on its queue. The fabric does not adjust or check weights.<br>This signal will remain asserted until eg_NextAck is asserted when it will be deasserted as part of the interface "handshake". This signal will not be asserted again until eg_NextAck is de-asserted. |
| eg_NextAck | The fabric asserts this signal to indicate the Next Queue request has been received and the request results (ob_NextEmpty, ob_NextQueueNum, and ob_NextQueueWeight) are valid. This signal is asserted until eg_NextReq is de-asserted when it will be de-asserted to complete the request "handshake". |
| ob_NextQueueNum[6:0] | This bus, when eg_NextAck is asserted, contains the value of the queue that would be scheduled next (assuming it is not empty). The queue is the next non-empty queue in a round-robin selection process (from lowest to highest number wrapping around to 0). |
| ob_NextQueueWeight[12:0] | This bus, when eg_NextAck is asserted, contains the value of the assigned weight (in 64 byte cells) assigned to the queue identified by the ob_NextQueueNum bus. |
| ob_NextEmpty | This signal, when asserted (and eg_NextAck is asserted) indicates that the queue identified by ob_NextQueueNum is empty (i.e. no "next" queue was found). |

*FIG. 12*

METHOD AND APPARATUS FOR SCHEDULING PACKET FLOW ON A FIBRE CHANNEL ARBITRATED LOOP

CROSS-REFERENCE TO RELATED APPLICATIONS

This application claims the benefit of U.S. Provisional Application No. 60/307,926, filed Jul. 26, 2001.

BACKGROUND OF THE INVENTION

1. Field of the Invention

The present invention generally relates to the field of network switches. More particularly, the present invention relates to a system and method that allows a network switch coupled to an arbitrated loop such as an Fibre Channel Arbitrated Loop (FC-AL) to transmit queued packets to a device on the arbitrated loop when opened by the device, and thus to utilize the arbitrated loop in full-duplex mode when possible.

2. Description of the Related Art

In enterprise computing environments, it is desirable and beneficial to have multiple servers able to directly access multiple storage devices to support high-bandwidth data transfers, system expansion, modularity, configuration flexibility, and optimization of resources. In conventional computing environments, such access is typically provided via file system level Local Area Network (LAN) connections, which operate at a fraction of the speed of direct storage connections. As such, access to storage systems is highly susceptible to bottlenecks.

Storage Area Networks (SANs) have been proposed as one method of solving this storage access bottleneck problem. By applying the networking paradigm to storage devices, SANs enable increased connectivity and bandwidth, sharing of resources, and configuration flexibility. SANs are typically implemented using Fibre Channel devices and Fibre Channel switches. Fibre Channel is a serial data transfer architecture designed for mass storage devices and other peripheral devices that require very high bandwidth.

Fibre Channel defines three topologies, namely Point-to-Point, Arbitrated Loop, and Fabric. Fibre Channel Arbitrated Loop (FC-AL) has become the most dominant Fibre Channel topology. FC-AL is capable of connecting up to 127 ports in a single network without the need of a fabric switch (also referred to herein as a network switch). However, a network switch may be installed at a port of an FC-AL (typically port 0) to interface the FC-AL to other FC-ALs, fabrics, etc. in a SAN. In an FC-AL, unlike the other two topologies, the media is shared among the devices, limiting each device's access. Unlike token-passing schemes, there is no limit on how long a device may retain control of an FC-AL. This demonstrates the "channel" aspect of Fibre Channel. There is, however, an optional Access Fairness Algorithm, which prohibits a device from arbitrating again until all other devices have had a chance to arbitrate.

Like most ring topologies, devices in an FC-AL may be connected to a central hub or concentrator. The cabling is easier to deal with, and the hub can usually determine when to insert or de-insert a device. Thus, a "bad" device or broken fiber (e.g. fiber optic cable) won't keep the entire network down.

Before an FC-AL is usable, it must be initialized so that each port obtains an Arbitrated Loop Physical Address (AL_PA), a dynamically assigned value by which the ports communicate. The AL_PA is a 1-byte value used in the Arbitrated Loop topology used to identify Loop Ports (L_Ports). L_Port is a generic term for any Fibre Channel port that supports the Arbitrated Loop topology. During initialization, a Loop master is selected that will control the process of AL_PA selection. If a network switch is present on the FC-AL, it will become Loop master; otherwise, the port with the numerically lowest Port Name will be selected as Loop master. Ports arbitrate for access to the Loop based on their AL_PA. Ports with lower AL_PAs have higher priority than those with higher AL_PAs.

In an FC-AL, when a device is ready to transmit data, it first must arbitrate and gain control of the Loop. It does this by transmitting an Arbitrate primitive signal, which includes the Arbitrated Loop Physical Address (AL_PA) of the device. Once a device receives its own Arbitrate primitive signal, it has gained control of the Loop and can now communicate with other devices by transmitting an Open primitive signal to a destination device. Once this happens, there exists a point-to-point communications channel between the two devices. All other devices in between the two devices simply repeat (e.g. retransmit) the data.

Fibre Channel flow control is based on a credit methodology where a source port must have a positive credit before transmitting a packet. The scheme works as follows when connected to an arbitrated loop. An arbitrated loop port receives (and provides) a BB_CREDIT value from (to) each device that they login to. This BB_CREDIT value represents the number of buffers that the port will have available when a new circuit is established. A port is allowed to transmit (upon establishing a new circuit), the number of data frames defined by BB_CREDIT without receiving R_RDY primitives. However, the port must then wait until R_RDY primitives have been received that equal the number of data frames transmitted. The port may then transmit a data frame only if the port has received more R_RDY primitives than transmitted data frames.

Note that a value of 0 is allowed for BB_CREDIT that indicates that the port cannot transmit more data frames than R_RDY primitives received. When a port supplies a positive value of BB_CREDIT, the port is guaranteeing that BB_CREDIT buffers will be available when the circuit is established. For a nonzero value, this implies that the circuit will not be closed unless there are BB_CREDIT buffers available to ensure that if another circuit is established immediately, the port will not be short of buffers.

FIG. 1A is a block diagram illustrating an exemplary topology of a Fibre Channel Arbitrated Loop (FC-AL) 702 coupled to a network 700 (e.g. SAN) via network switch 710. The connection to network 700 is typically to an FC point-to-point, FC fabric, or another FC-AL, which in turn may link to other FC topologies or alternatively may be bridged to other data transports (e.g. Ethernet, SCSI) that together make up the SAN. Six devices, including network switch 710 and devices 712A–712E, are shown in the FC-AL 702. Data flows in only one direction on the FC-AL 702, as illustrated by the direction of the arrows connecting the devices in the loop. Data sent from one device to another device on the FC-AL 702 must pass through any and all devices between the two devices in the downstream direction. For example, if device 712C needs to send data to device 712E, the data is first passed to device 712D, which retransmits the data to device 712E. Also note that the network switch may have other connections that are not shown.

FIG. 1B is a flow diagram illustrating packet flow in an FC-AL 702, and shows a hub 714 used to interconnect the devices at port 0 through port 5. In this example, a network switch at port 0 couples the FC-AL 702 to the network 700. Note that data on the FC-AL 702 as illustrated in FIG. 1B may flow in only one direction on the FC-AL 702, as illustrated by the direction of the arrows connecting the devices to the hub 714. Data sent from one port to a second port on the FC-AL 702 must pass through any and all ports between the two ports in the downstream direction. For example, if port 0 needs to send data to port 3, it first arbitrates to gain control of the loop, then opens the device at port 3, and then transmits the data (through the hub 714) to port 1. The data is then retransmitted through the hub to port 2, and then finally to port 3, which receives the data (without retransmitting).

Referring again to FIG. 1A, only one device can gain control of and hold the FC-AL 702 at a time. A device first arbitrates for the FC-AL 702. When the device gains control of the loop, it opens a second device. The first device may then send frames of data (also referred to as packets) to the second device. In some instances, if the second device has packets for the first device, it may send the packets to the first device via FC-AL 702 after being opened by the first device and while receiving packets from the first device. When two devices are transmitting to each other simultaneously, the FC-AL is operating in full-duplex mode. When a first device is transmitting to a second device, and the second device is not transmitting, the FC-AL is operating in half-duplex mode. Obviously, for maximizing bandwidth utilization of the fibre, it is advantageous for the FC-AL 702 to operate in full-duplex mode as much as possible.

Network switch 710 serves as an interface between FC-AL 702 and network 700. Network switch 700 may receive FC packets from a device 712 on the FC-AL 702 that are destined for one or more devices on network 700, and then may retransmit the packets on network 700 to the one or more devices. Network switch 700 may also receive packets from a device on network 700 and then route the packets to the destination device 712 of the packets on the FC-AL 702.

In connecting to devices on the FC-AL 702, network switch 710 behaves similarly to the other devices 712 on the FC-AL. Switch 710 must arbitrate for the loop and, when it gains control, open a device 712 to transmit to. Likewise, a device 712 may open network switch 710 after gaining control of the loop. Since network switch 710 may have to wait to gain control of the FC-AL 702 to transmit packets to a device 712, or conversely may have to wait to transmit packets from a device 712 on FC-AL 702 to a device on network 700, network switch 710 typically includes buffer memory for storing packets waiting to be transmitted.

FIG. 2 is a data flow diagram illustrating a prior art network switch 710 opening a device 712N on an FC-AL. At 730, network switch 710 first arbitrates for and gains control of the FC-AL, and then opens device 712N to begin transmitting incoming packet(s) 720 to the device. Packets 720 may have been previously received by fabric 710 from a source device on network 700. When network switch 710 opens device 712N, the device may have data to send to switch 710. Device 712N may transmit the data to switch 710 in outgoing packet(s) 722 while receiving the incoming packet(s) 720 from switch 710. Thus, the FC-AL may be utilized in full-duplex mode when network switch 710 opens a device 712.

FIG. 3 is a data flow diagram illustrating a prior art network switch being opened by a device. At 732, device 712N on an FC-AL first arbitrates for and gains control of the FC-AL, and then opens the network switch 710 to begin transmitting outgoing packet(s) 722 to network switch 710. Network switch 710 may have data queued for device 712N when opened by the device. However, when opened by device 712N, network switch 710 is not able to determine if it has queued data for the device 712, or to transmit the queued data to the device 712N concurrent with receiving outgoing packets 722 from the device. Prior art network switches, when operating in full duplex mode, may be blocked from sending data because data for another device on the loop is "blocking" access, thus limiting the efficiency of use of bandwidth on the FC-AL in full duplex mode.

Frame Ordering and Network Switch Performance on an Arbitrated Loop

An arbitrated loop may generally be defined as a set of devices that are connected in a ring topology as in the example FC-AL shown in FIG. 1A. The arbitrated loop protocol requires all devices on the loop to arbitrate for control of the loop. A device will arbitrate for control of the loop when it has data frames it wishes to send to another device on the loop. The device, when it wins arbitration, will then establish a connection to the device it wishes to transfer data. After all desired data frames are transferred, the loop is "closed". The device that controls the loop may then give up the loop for arbitration or open another device to transfer data frames. The following summarizes the arbitrated loop process:

a) Arbitrate for control of the loop.
b) Wait to win arbitration.
c) Open a connection with the destination device when arbitration is won.
d) Exchange data frames with the destination device.
e) Close the connection.
f) Release the loop for arbitration OR repeat steps c–e The loop is utilized for transferring data only during step c). The remaining steps represent protocol overhead that tends to reduce the overall usable bandwidth on the arbitrated loop.

Prior art network switches typically have a single queue for holding frames to be output to the arbitrated loop. The order of frames on the queue determines the order in which frames are output to the arbitrated loop and hence the ordering of arbitration-open-close cycles which need to be performed. In some conditions, loop utilization may be less than optimal. For example, if there are frames in the queue for two or more devices and the frames from the devices are interleaved, the overhead for opening and closing devices may reduce the utilization of the loop bandwidth by an amount that may depend on average frame sizes and on the order of the frames on the queue.

For example, consider the case where the frames are ordered as shown in FIG. 4A. In this figure, the letters A and B represent frames on the queue for devices A and B on the loop. The ordering of frames in the queue of FIG. 4A forces the switch to transfer only one frame per each establishment of a connection. Processing of the frames may be as follows (assuming the switch holds the loop for an extended period of time before allowing arbitration to occur):

a) Arbitrate
b) Open Device A
c) Transfer Data Frame
d) Close Device A
e) Open Device B
f) Transfer Data Frame
g) Close Device B
h) Repeat b-d
i) Repeat e-g j) Continue until queue empty or maximum time loop can be held occurs.

The loop utilization in this example may thus be less than optimal. The overhead for opening and closing devices may reduce the utilization of the loop bandwidth, for example, by 10–30% depending on average frame sizes.

FIG. 4B illustrates a more optimal frame ordering when compared to the frame ordering of FIG. 4A which may have reduced loop overhead since the switch may send multiple frames each time a device is opened or closed. However, the frame transmit scheduling logic used in network switches and other devices that carry IP (Internet Protocol) traffic are typically designed to generate traffic (e.g. packet or frame flow) with low jitter. As used herein, the term "jitter" relates to the transmission of frames from a source to a destination. "Low jitter" includes the notion of frames being transmitted and received in a steady flow, and implies that the temporal spacing between the frames at the receiver remains as constant as possible. Thus, prior art network switches typically use a low-jitter scheduling algorithm that attempts to interleave traffic from different sources as much as possible. This interleaving may result in the frames typically arriving at the network switch in a less than optimal ordering (e.g. more like FIG. 4A than FIG. 4B). Therefore, it may be desirable to implement a scheduling algorithm for a network switch specifically when interfacing an arbitrated loop such as an FC-AL with an IP network that carries low-jitter traffic.

Transfer Ready (XFER_RDY) Delay and Write Performance

In a Storage Area Network (SAN), a host bus adapter, e.g. a Fibre Channel host bus adapter, may be connected to a network switch performing a mixture of read/write transfers to multiple disk drives. Under some conditions, the write performance may be considerably lower than the read performance. While read performance under these conditions is typically as expected, write performance may be considerably less than expected. When only write operations are performed, the performance for the write operations is typically as expected. The reduced write performance during combined read and write operations may be the result of a large buffer within the network switch that causes the delivery of transfer ready (XFER_RDY) frames to be delayed when both write and read operations are being performed.

To understand the implication of delaying the delivery of XFER_RDY frames, it is necessary to understand the protocols for read and write operations by devices using FCP (Fibre Channel Protocol for SCSI). FCP uses several frame sequences to execute a SCSI command between the initiator of a command (the initiator) and the target of the command (the target). An example of an initiator is a host bus adapter such as a Fibre Channel host bus adapter and an example of a target is a storage device such as a disk drive. The initiator and target communicate through the use of information units (IUs), which are transferred using one or more data frames. Note that an IU may consist of multiple data frames but may be logically considered one information unit. The IUs for FCP may include, but are not limited to, the following:

FCP_CMND—The FCP_CMND IU is sent from an initiator to a target and contains either a SCSI command or a task management request to be executed by the target.

FCP_XFER_RDY—The FCP_XFER_RDY IU is sent from a target to an initiator for write operations and indicates that the target is ready to receive part or all of the data for a write command.

FCP_DATA—The FCP_DATA IU is sent from an initiator to a target for write commands and from targets to initiators for read commands. An FCP_DATA IU consists only of the actual SCSI command data.

FCP_RSP—The FCP_RSP IU is sent from a target to an initiator and contains the SCSI status, Sense information (if any), protocol status and completion status of task management functions.

FCP_CONF—The FCP_CONF IU is sent from an initiator to a target and provides confirmation that the initiator received the FCP_RSP IU. This IU is optional.

FIG. 5 shows an example of the processing of an FCP Read command. The initiator 200 sends the read command in an FCP_CMND IU to the target 210. When the target 210 has the data available, it returns the data to the initiator 200 in one or more FCP_DATA IUs. When all of the data has been transmitted, the target 210 sends an FCP_RSP IU with the command status information. The initiator 200 may optionally send an FCP_CONF IU to the target 210 indicating that the FCP_RSP IU was received. When an initiator 200 issues the read command, it must be prepared to receive all of the data indicated by the command (i.e. buffer(s) must be available for the returned data).

FIG. 6 shows an example of an FCP write command. The initiator 200 sends the write command to the target 210 in an FCP_CMND IU. The target 210 responds with an FCP_XFER_RDY IU indicating the data it is ready to accept. The initiator 200 then sends the data to the target in a single FCP_DATA IU. After all of the data requested by the target 210 has been transferred, the target 210 will either send another FCP_XFER_RDY IU requesting additional data or send an FCP_RSP_IU containing the command status information. The initiator 200 may optionally send an FCP_CONF to the target 210 indicating that the FCP_RSP IU was received. (Note that the FCP_DATA IU may consist of multiple data frames but is logically considered one information unit.)

Preferably, when an initiator 200 issues a write command, the FCP_DATA IU can be returned as soon as the initiator 200 receives the FCP_XFER_RDY IU from the target 210. If an initiator 200 is performing overlapping write commands (i.e. there are multiple outstanding write commands), it can maintain a constant flow of FCP_DATA IU frames as long as it has received at least one XFER_RDY IU for which it has not yet transmitted the data. However, if the FCP_XFER_RDY IU is delayed, the initiator 200 will not maintain a constant flow of output data when it is waiting for an XFER_RDY IU to transmit data.

When only write operations are performed, the XFER_RDY IU see little delay because only FCP_RSP and FCP_XFER_RDY IUs are being sent from the targets to the initiator. The FCP_RSP IUs have little effect on the FCP_XFER_RDY latency because only one FCP_RSP IU is received per SCSI command and the FCP_RSP IUs are small. However, when read and write operations are performed simultaneously, the initiator 200 will also be receiving FCP_DATA IU from the target(s) 200. For typical SCSI commands (e.g. 8K byte to 64 Kbyte commands), there can be a lot of FCP_DATA frames waiting in network switch queues to be forwarded to the initiator 200. Thus, the XFER_RDY IU may be significantly delayed due to queuing of data frames by network switches. Thus, write performance can be degraded significantly when performing a combination of read and write commands. In larger networks, write performance may be degraded when XFER_RDY IUs are delayed due to other traffic, therefore the write performance degradation may not be limited to instances where an initiator 200 is performing both read and write operations.

FIG. 7 illustrates how XFER_RDY IUs can be delayed due to network switch queuing. The amount of switch queuing 300 may affect the latency of XFER_RDY IUs being returned to an initiator 200. Network switches with small amounts of buffer memory (i.e. small queues 300) may experience fewer problems than network switches with larger amounts of buffer memory (i.e. larger queues 300) because the XFER_RDY IUs may be delayed less within a switch with a small queue 300. Prior art Fibre Channel switches typically have small amounts of buffer memory and therefore this problem may not appear in these switches. Network switches that support multiple network protocols may be more susceptible because they contain more buffering to support the other protocols. For example, a network switch that supports Fibre Channel and Ethernet may have buffering for 512 frames per port while prior art Fibre Channel-only switches may have buffering for only 16 to 32 frames.

SUMMARY

The problems set forth above may at least in part be solved by a system and method that allows a network switch to transmit queued packets to a device when opened by the device, and thus to utilize the Fibre Channel Arbitrated Loop (FC-AL) in full-duplex mode when possible. A network switch may serve as an interface between one or more devices on FC-AL and one or more devices on a network. In one embodiment, a network switch may include a Fibre Channel Media Access Control (FC-MAC), network switch fabric, a query interface, a packet request interface and a Media Access Control (MAC). The network switch couples to the FC-AL through the FC-MAC. The network switch attaches to the network through the MAC. In one embodiment, the MAC may be a second FC-MAC, and the network may be a Fibre Channel, for example, one of an FC point-to-point, FC fabric, and another FC-AL, which in turn may link to other FC topologies or alternatively may be bridged to other data transports (e.g. Ethernet, SCSI) that together make up a Storage Area Network (SAN). In other embodiments, the MAC may interface to another transport protocol such as Ethernet (e.g. Gigabit Ethernet) or SCSI. In one embodiment, network switch may implement SoIP to facilitate communications between a plurality of data transport protocols.

In one embodiment, the network switch fabric may include a scheduler and a plurality of queues. Incoming packets from devices on the network may be added to the queues. The incoming packets are each addressed to one of the devices on the FC-AL. In one embodiment, there is one queue associated with each device on the FC-AL for queuing incoming packets for the device. When the network switch receives an incoming packet for a device on the FC-AL, the packet is added to the queue associated with the device. There may be up to 126 devices coupled to the FC-AL, therefore, in one embodiment, there may be up to 126 queues for incoming packets, with each queue assigned to one of the devices on the FC-AL. Other embodiments may include more than 126 queues to support transfer ready (XFER_RDY) reordering as described herein. In one embodiment, the fabric may also include queues for storing outgoing packets received from devices on the FC-AL and destined for devices on the network.

In one embodiment, the query interface and packet request interface are modules for controlling the FC-MAC's access to the scheduler and thus to the queues. The FC-MAC may use the query interface to request a next non-empty queue. In one embodiment, the queues storing incoming packets for devices on the FC-AL may be serviced by the scheduler using a round-robin method. In other embodiments, other methods for servicing the queues may be implemented by the scheduler. The FC-MAC may request data to be read from the queues when the FC-MAC knows that the requested data can be transmitted on the attached FC-AL. For example, the FC-MAC may have been opened in full-duplex mode by a device and have positive credit, or alternatively the FC-MAC may have opened a device on the FC-AL and have positive credit.

The following is a description of the network switch opening a device on the FC-AL. The FC-MAC may request the scheduler to identify a next non-empty queue through the query interface. The scheduler may start from the current queue number and locate the next non-empty queue. The scheduler may then return the identity of the next non-empty queue to the FC-MAC through the query interface. In one embodiment, the fabric may also return information, e.g. an assigned weight, for the next queue for use by the FC-MAC in determining how long data from the next queue can be output. If all queues are currently empty, then the scheduler may return a signal to the FC-MAC to indicate that there is no non-empty queue available. In one embodiment, the scheduler may return the current queue number to indicate that there is currently no non-empty queue.

After receiving the identity of the next non-empty queue, the FC-MAC may open the device associated with the queue on the FC-AL. Once the device is opened, the FC-MAC may send incoming data from the queue associated with the device in Fibre Channel (FC) packets to the device over the FC-AL. In one embodiment, the FC-MAC may use the packet request interface to send a read request to the scheduler requesting the queued data for the device. In one embodiment, the scheduler may return an acknowledgement to the FC-MAC in response to the read request if there is still queued data in the queue for the device. The fabric may then send the data for the device from the identified next non-empty queue to the FC-MAC. The FC-MAC may then send the data in FC packets to the device. In one embodiment, the scheduler may return a "last packet" signal when there is only one packet in the queue for the device. This signal allows the FC-MAC to advance to the next non-empty queue (if any) without having to perform another read request to determine that the current queue is empty.

When opened by the network switch, if the device currently has data for the network switch (e.g. FC packets to be sent to a device on the network), then the device may send the data in outgoing FC packets to the FC-MAC concurrent with receiving the incoming FC packets from the FC-MAC. Thus, the FC-AL may be utilized in full-duplex mode when the network switch opens a device on the FC-AL.

In one embodiment, data in a queue may go "stale" after a certain amount of time and be garbage collected. It may occur that, when the FC-MAC sends a read request to the scheduler to send packets from a previously identified next non-empty queue, the data in the queue may have been garbage collected since the queue was identified as non-empty through the query interface. If this occurs, then the scheduler may return an empty queue signal to the FC-MAC through the packet request interface. This is to prevent the FC-MAC from waiting to receive data from a queue that was previously identified as non-empty but has, in the meantime, become empty.

The following is a description of one embodiment of the operation of a device on the FC-AL opening the network switch in full-duplex mode. The device that opens the network switch (through the FC-MAC) typically has data to be sent to the network switch in one or more FC packets. When opened by a device on the FC-AL, the FC-MAC knows which device has opened it, and may send a read request for the device that opened it to the scheduler, e.g. through the packet request interface. In one embodiment, the scheduler may return an acknowledgement to the FC-MAC in response to the read request if there is currently queued data for the device in a queue associated with the device. In one embodiment, if there is currently no queued data for the device, then the scheduler may return an empty queue signal to FC-MAC. In one embodiment, the scheduler may return a "last packet" signal if there is only one packet queued for the device.

If there is currently data for the device in the queue associated with the device, the network switch fabric may send the data to the FC-MAC. The FC-MAC may then transmit the data in FC packets to the device. If the device currently has data to be sent through the network switch, outgoing FC packets may be transmitted by the device to the FC-MAC on the FC-AL concurrent with the FC-MAC transmitting the incoming FC packets to the device on the FC-AL. Thus, unlike prior art network switches, embodiments of the network switch as described herein may utilize the FC-AL in full-duplex mode more efficiently when a device on the FC-AL opens the network switch.

In one embodiment, there may be a plurality of queues assigned to a device on the FC-AL for queuing incoming packets for the device. This embodiment may be used with an FC-AL with only one device other than the network switch connected. In this embodiment, the plurality of queues for the device may be serviced using priority scheduling, round robin, or other arbitrary schemes.

Embodiments of the network switch as described herein may be used in multiport switches. In some embodiments of a multiport switch, the hardware may be replicated for each port. In other embodiments, portions of the hardware may be shared among a plurality of ports. For example, one embodiment may replicate the FC-MAC, query interface, and packet request interface, but may share a common fabric. Another embodiment may share a memory among the plurality of ports in which the queues may be comprised, and the rest of the hardware may be replicated for each port. Each port of a multiport switch may couple to a separate FC-AL. Embodiments of 2-, 4-, 8- and 16-port switches are contemplated, but other embodiments may include other numbers of ports and/or switches. Embodiments of multiport switches where a portion of the ports interface to other data transport protocols (e.g. Ethernet, Gigabit Ethernet, SCSI, IP, etc.) are also contemplated.

Embodiments of a high jitter scheduling algorithm for network switches are described that may be used to improve the utilization of bandwidth on arbitrated loops such as Fibre Channel Arbitrated Loops (FC-ALs), particularly when interfacing an arbitrated loop with an IP network that carries low-jitter traffic. The high jitter algorithm may use a separate queue for each device on the arbitrated loop. Note that, in embodiments that also implement transfer ready reordering as described below, additional queues may be used for the high-priority scheduling of XFER_RDY packets. Frames are entered on a queue based on the frame's destination (device) address. The effect of separate queues is that received frames have now been effectively reordered when compared to prior art single-queue implementations. The scheduling algorithm may then forward frames to the arbitrated loop port (and thus device) from a specific queue for a programmed limit (also referred to as weight). Programmed limits that may be used include, but are not limited to, a programmed period of time, a programmed amount of data (e.g. in words), or a programmed number of frames. In one embodiment, the queue weights for all the queues may be programmed with the same value. In one embodiment, the queues may be assigned individual, possibly different weights. In one embodiment, instead of having programmed limits, the limits may be hard-coded (i.e. not changeable).

In one embodiment, the high jitter scheduler may service the queues in a round robin fashion. Each queue is sequentially checked to see if it has data frames. If the queue has data frames, the scheduler may forward frames from this queue until the programmed limit (i.e. the weight) is reached. The scheduler may then check for the next queue with available data and forward frames from that queue until its "weight" is met. The scheduler may continue checking each queue until it reaches the last queue when it repeats the process beginning with the first queue. Methods of servicing the queues with a high jitter scheduler other than the round-robin method as described above are possible and contemplated.

In one embodiment, the high jitter scheduling algorithm may be implemented with fewer queues than the possible number of devices on the loop based on the assumption that arbitrated loops may actually have less than the possible number of devices. In this embodiment, multiple devices may be assigned to each queue. Generally, in this embodiment, if X is the possible number of devices on the loop, and Y is the number of devices assigned to each queue, then N (the total number of queues) is equal to X/Y. In this embodiment, performance may be affected on the loop only if the number of devices actually on the loop exceeds N. Note that, even if the number of devices exceeds N, performance still may be improved when compared to prior art embodiments that do not use high jitter scheduling.

Embodiments of transfer ready (XFER_RDY) reordering through the use of one or more high priority queues are described. In one embodiment of a network switch, an output that is connected to a Fibre Channel device may be allocated an additional queue specifically for XFER_RDY frames. Frames on this queue are given a higher priority than frames on the normal queue. The frame distribution logic identifies XFER_RDY frames and sends these frames to the high priority queue, and sends other frames to a low (or normal) priority queue. The scheduler logic forwards frames from the XFER_RDY Queue before frames on the low priority queue. Thus, in this embodiment, XFER_RDY frames may be forwarded with lower latency.

Transfer ready reordering through the use of high-priority queuing may be performed for other protocols than FCP that carry SCSI commands and use a response from the target to elicit the initiator to transmit the write data. For example, the iSCSI protocol may use a similar method as FCP except that the target requests write data using an RTT (Ready To Transfer) protocol data unit. Transfer ready reordering through the use of high-priority queuing may be implemented in devices that interface initiators to the network (e.g. a network switch, bridge, gateway or router). Other devices in the network may also implement transfer ready reordering through the use of high-priority queuing.

In one embodiment, a single queue may be used to implement transfer ready reordering through the use of high-priority queuing if the queue implementation allows the insertion of data frames at arbitrary points within the queue. For example, a linked list queue implementation may allow the XFER_RDY frames to be inserted at the front of the queue. However, the ordering of XFER_RDY frames is preferably maintained.

In some embodiments, transfer ready reordering through the use of high-priority queuing may also be implemented for protocols that rely on TCP or TCP-like protocols for data transport such as iFCP, iSCSI or FCIP. Protocols that rely on TCP or TCP-like protocols may maintain a buffer of data that has been transmitted but not acknowledged. This data is typically saved until the receiver acknowledges the data in the event that retransmission of the data (or a portion thereof) is necessary. In addition, a buffer of data waiting to be transmitted may also be maintained. In these embodiments, a single buffer may be used with pointers indicating the location of data not yet transmitted. The XFER_RDY data frames (or equivalent) are preferably not forwarded ahead of data already transmitted. However, the XFER_RDY (or equivalent) data frames may be forwarded ahead of data waiting to be transmitted.

BRIEF DESCRIPTION OF THE DRAWINGS

The foregoing, as well as other objects, features, and advantages of this invention may be more completely understood by reference to the following detailed description when read together with the accompanying drawings in which:

FIG. 2 is a data flow diagram illustrating a prior art network switch opening a device for full-duplex data transmission;

FIG. 3 is a data flow diagram illustrating a prior art network switch being opened by a device for half-duplex data transmission;

FIG. 12 is a table listing FC-MAC/Fabric signal descriptions according to one embodiment;

Figure 1A:
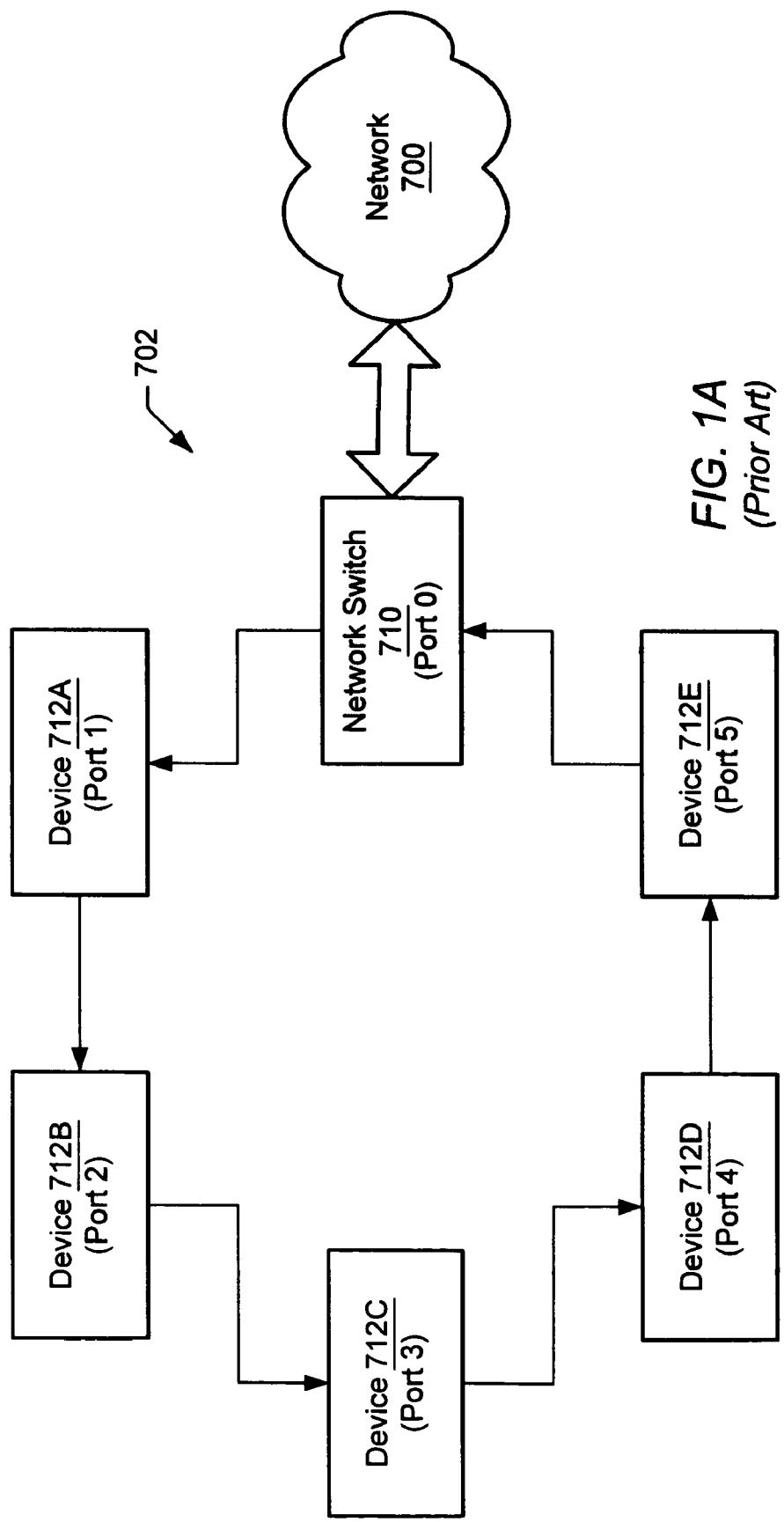
FIG. 1A is a block diagram illustrating an exemplary topology of a Fibre Channel Arbitrated Loop (FC-AL)
Figure 1B:
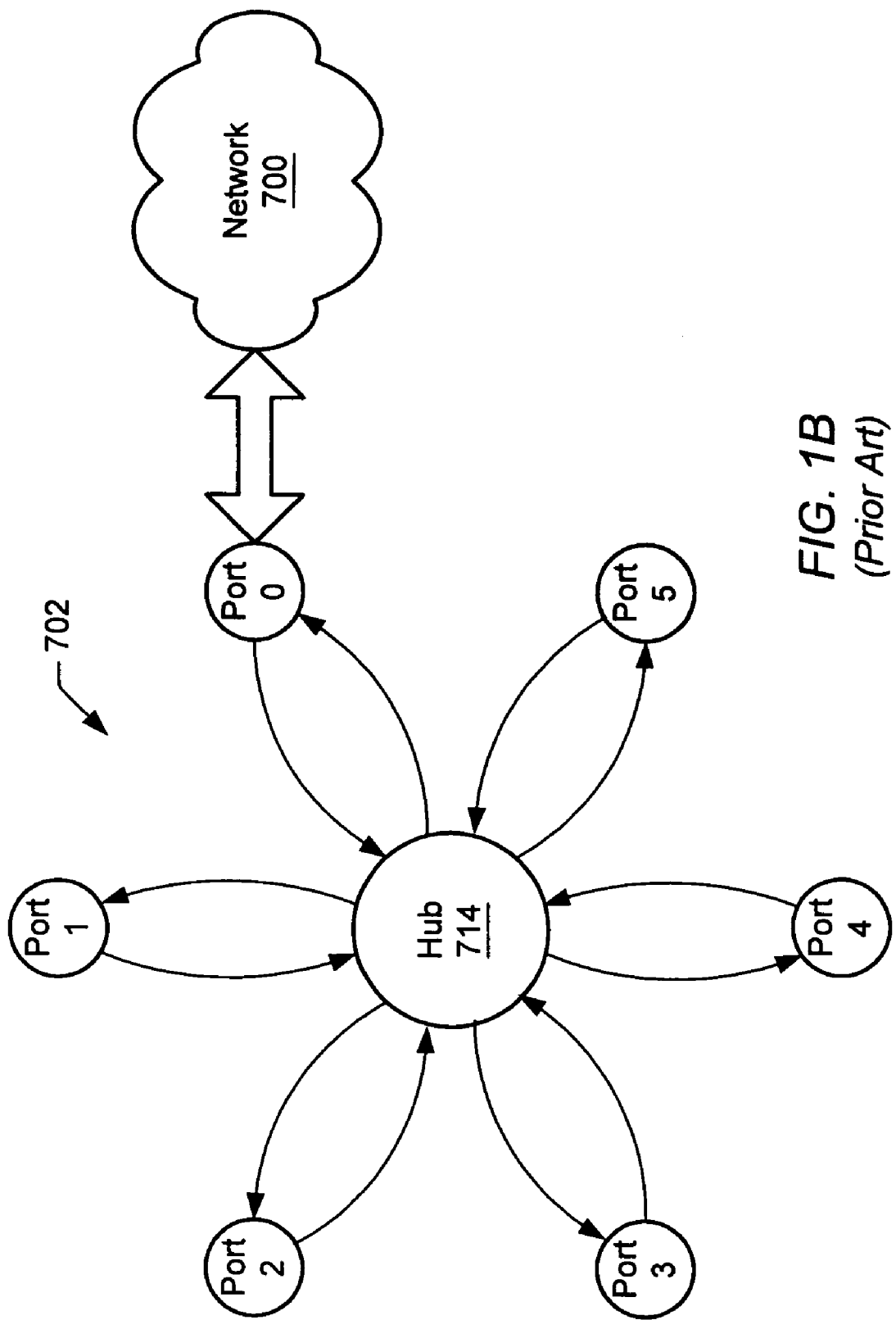
FIG. 1B is a flow diagram illustrating packet flow in a Fibre Channel Arbitrated Loop (FC-AL) with hub.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF SEVERAL EMBODIMENTS

The United States Patent Application titled "METHOD AND APPARATUS FOR TRANSFERRING DATA BETWEEN IP NETWORK DEVICES AND SCSI AND FIBRE CHANNEL DEVICES OVER AN IP NETWORK" by Latif, et al., filed on Feb. 8, 2000 (Ser. No. 09/500,119), is hereby incorporated by reference in its entirety. This application describes a network switch that implements a protocol referred to herein as Storage over Internet Protocol (SoIP), and that allows efficient communication between the SCSI (Small Computer System Interface), Fibre Channel and Ethernet (e.g. Gigabit Ethernet) protocols. In general, a majority of storage devices currently use "parallel" SCSI or Fibre Channel data transfer protocols, whereas most LANs use an Ethernet protocol, such as Gigabit Ethernet. SCSI, Fibre Channel and Ethernet each use a different individual format for data transfer. For example, SCSI commands were designed to be implemented over a parallel bus architecture and therefore are not packetized. Fibre Channel, like Ethernet, uses a serial interface with data transferred in packets. However, the physical interface and frame formats between Fibre Channel and Ethernet are not compatible. Gigabit Ethernet was designed to be compatible with existing Ethernet infrastructures and is therefore based on Ethernet packet architecture.

Figure 8:
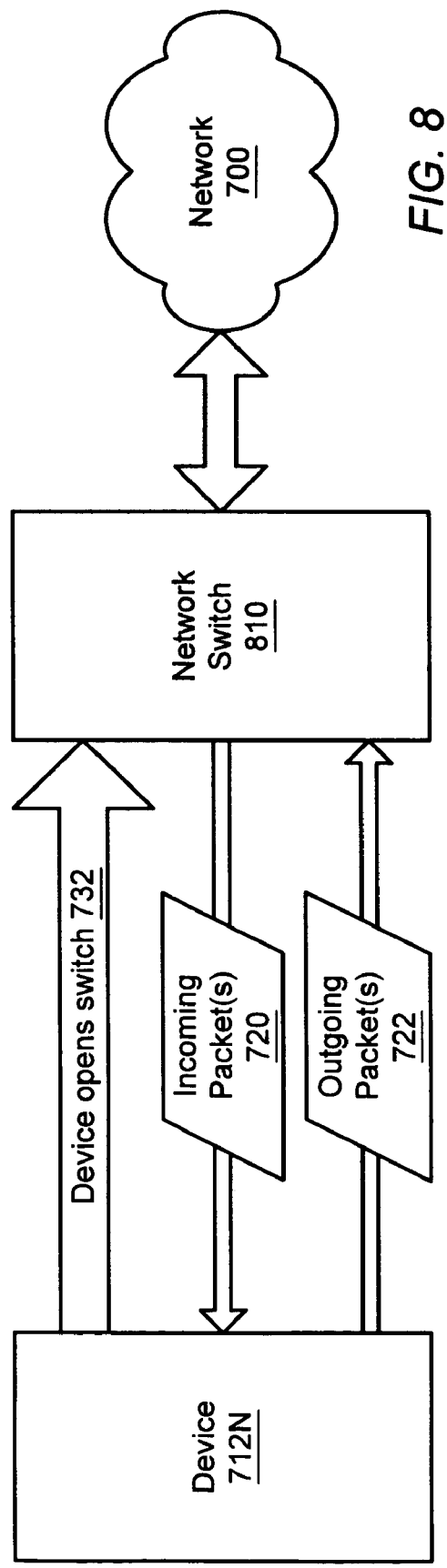
FIG. 8 is a data flow diagram illustrating one embodiment of a network switch being opened by a device.

FIG. 8 is a data flow diagram illustrating one embodiment of a network switch coupled to an FC-AL being opened by a device on the FC-AL for full-duplex data transmission. Device 712N may have packets to send to network switch 810 for sending to a destination device or devices on network 700. At 732, device 712N first arbitrates for and gains control of the FC-AL, and then opens the network switch 810 to transmit outgoing packet(s) 722 to network switch 810.

Network switch 810 recognizes that it has been opened by device 712N. In one embodiment, network switch 810 may receive an Open primitive signal from device 712N. In one embodiment, network switch 810 may include memory for queuing data for one or more devices on the FC-AL, including device 712N. In response to being opened by device 712N, network switch 810 determines if there is any incoming data queued for device 712N. If there is queued data for device 712N, then network switch 810 may transmit the queued data to device 712N in incoming packet(s) 720 concurrent with receiving outgoing packet(s) 722 from device 712N. Thus, unlike prior art network switches, network switch 810 may utilize an FC-AL in full-duplex mode more efficiently when opened by a device 712 on the FC-AL.

Figure 9:
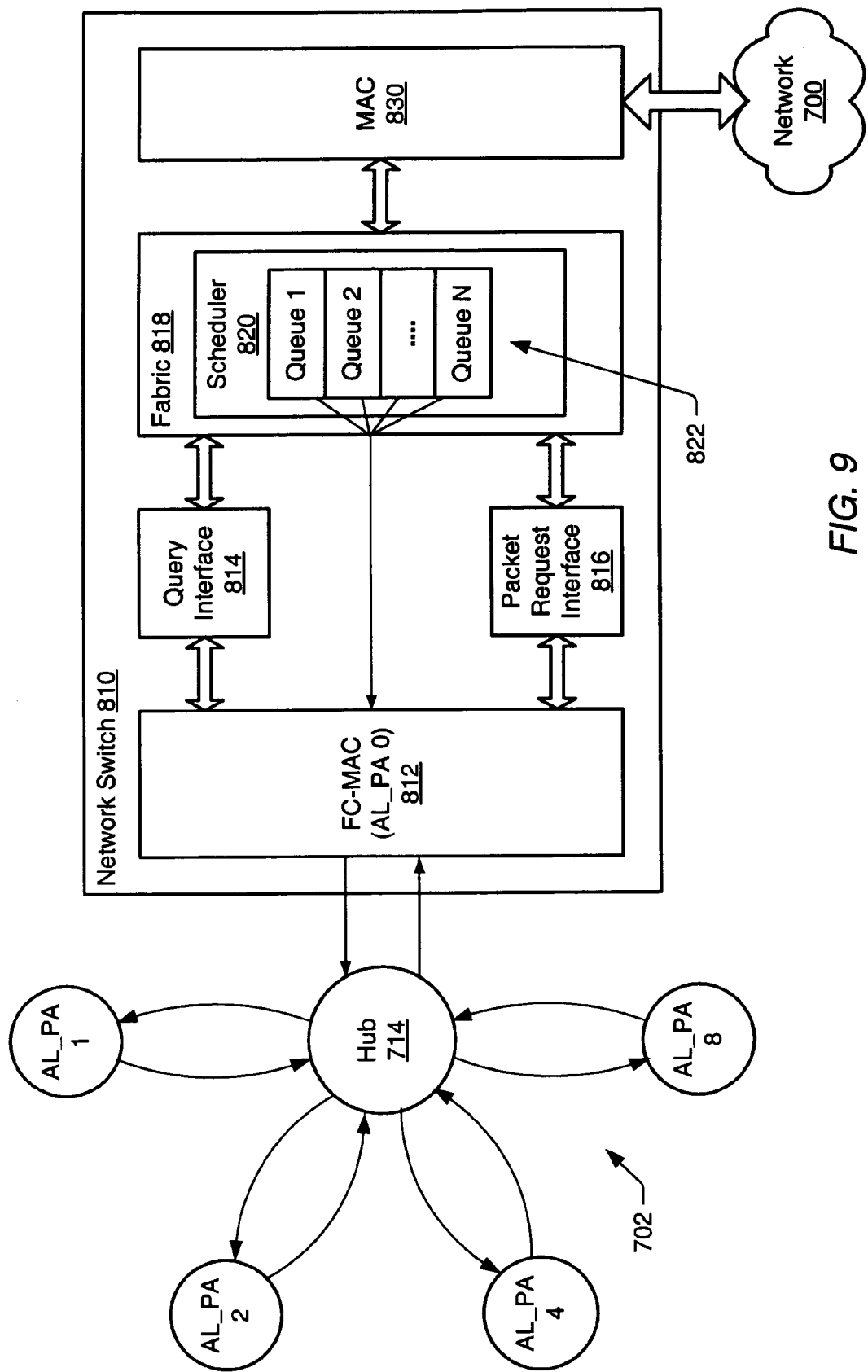
FIG. 9 is a block diagram illustrating one embodiment of a network switch as illustrated in FIG. 8.

FIG. 9 is a block diagram illustrating one embodiment of a network switch 810 in more detail. Network switch 810 may serve as an interface between one or more devices on FC-AL 702 and one or more devices on network 700. In one embodiment, devices on the FC-AL 702 may be connected to a central hub 714. A hub 714 makes cabling easier to deal with, and the hub may determine when to insert or remove a device. In another embodiment, the devices in the FC-AL 702 may be directly connected without going through a hub.

In one embodiment, network switch 810 may include a Fibre Channel Media Access Control (FC-MAC) 812, a fabric 818, a query interface 814, a packet request interface 816 and a Media Access Control (MAC) 830. The network switch 810 couples to the FC-AL 702 through the FC-MAC 812. In one embodiment, the FC-AL media (the fibre optic or copper cable connecting the devices to form the loop) physically connects to the network switch 810 through a transceiver and the FC-MAC 812 receives FC packets from and transmits FC packets to devices on the FC-AL 702 through the transceiver in half-duplex or full-duplex mode. This example shows five devices comprising the FC-AL 702, including network switch 810. In this example, the FC-MAC 812 is assigned Arbitrated Loop Port Address (AL_PA) 0 during the initialization of the FC-AL 702, and the other devices are assigned AL_PAs 1, 2, 4 and 8.

The network switch 810 attaches to the network 700 through MAC 830. In one embodiment, MAC 830 may be a second FC-MAC, and the connection to network 700 may be to one of an FC point-to-point, FC fabric, and another FC-AL, which in turn may link to other FC topologies or alternatively may be bridged to other data transports (e.g. Ethernet, SCSI) that together make up a SAN. In other embodiments, MAC 830 may interface to another transport protocol such as Ethernet (e.g. Gigabit Ethernet) or SCSI. In one embodiment, network switch 810 may implement SoIP to facilitate communications between a plurality of data transport protocols. More information on embodiments of a network switch incorporating SoIP and supporting a plurality of protocols may be found in the U.S. patent application titled "METHOD AND APPARATUS FOR TRANSFERRING DATA BETWEEN IP NETWORK DEVICES AND SCSI AND FIBRE CHANNEL DEVICES OVER AN IP NETWORK" (Ser. No. 09/500,119) that was previously incorporated by reference.

Fabric 818 includes a scheduler 820 comprising a plurality of queues 822. In one embodiment, scheduler 820 comprises 256 queues 822. Incoming packets from devices on network 700 are queued to the queues 822. The incoming packets are each addressed to one of the devices on the FC-AL 702. In one embodiment, there is one queue 822 in the scheduler associated with each device on the FC-AL for queuing incoming packets for the device. When network switch 810 receives an incoming packet for a device on the FC-AL 702, the packet is queued to the queue 822 associated with the device. For example, there may be up to 126 devices coupled to the FC-AL 702, therefore, in one embodiment, there may be up to 126 queues 822, with each queue assigned to one of the devices on FC-AL 702. In one embodiment, queues 822 may also include queues for storing outgoing packets received from devices on the FC-AL 702 and destined for devices on network 700. In one embodiment, there may be 126 queues 822 for outgoing packets and 126 queues 822 for incoming packets, yielding a total of 252 queues. One embodiment that supports XFER_RDY reordering as described herein may include additional queues for receiving XFER_RDY frames.

Query interface 814 and packet request interface 816 are modules for controlling the FC-MAC 812's access to the scheduler 820 and thus to queues 822. FC-MAC 812 may use query interface 814 to request scheduler 820 to determine a next non-empty queue 822. In one embodiment, queues 822 storing incoming packets for devices on the FC-AL 702 may be serviced by the scheduler 820 using a round-robin method. In other embodiments, other methods for servicing the queues 822 may be implemented by the scheduler.

The FC-MAC 812 may request data to be read from queues 822 when the FC-MAC 812 knows that the requested data can be transmitted on the attached FC-AL 702. For example, the FC-MAC 812 may have been opened in full-duplex mode by a device and have positive credit, or alternatively the FC-MAC 812 may have opened a device on the FC-AL 702 and have positive credit.

The following is a description of the FC-MAC 812 opening a device on the FC-AL 702. The FC-MAC 812 may request scheduler 820 to identify a next non-empty queue 822 through the query interface 814. In one embodiment, the FC-MAC 812 may provide a current queue number to fabric 818. In another embodiment, fabric 818 may maintain the current queue number, and FC-MAC 812 may request a next non-empty queue 822. Scheduler 820 may start from the current queue number and locate the next non-empty queue 822. For example, if queue 20 is the current queue number and queue 32 and 44 are non-empty, then queue 32 would be located by scheduler 820 as the next non-empty queue. Scheduler 820 would then return the identity of the next non-empty queue (queue 32) to the FC-MAC 812 through the query interface 814. In one embodiment, the fabric 818 may also return information, e.g. an assigned weight, for the next queue 822 for use by the FC-MAC 812 in determining how long data from the next queue 822 can be output. If all queues 822 are currently empty, then the scheduler 820 may return a signal to the FC-MAC 812 through query interface 814 to indicate that there is no non-empty queue 822 available. In one embodiment, the scheduler 820 may return the current queue number to indicate that there is currently no non-empty queue.

After receiving the identity of the next non-empty queue 822 from the query interface 814, the FC-MAC 812 may open the device associated with the queue 822 on the FC-AL 702. If the FC-MAC 812 does not currently control the FC-AL 702, it may first arbitrate for and gain control of the FC-AL 702 before opening the device. Once the device is opened, the FC-MAC 812 may send incoming data from the queue 822 in FC packets to the device over the FC-AL 702. In one embodiment, the FC-MAC 812 may use the packet request interface 816 to send a read request to the scheduler 820 requesting the queued data for the device. In one embodiment, the scheduler 820 may return an acknowledgement to the FC-MAC 812 in response to the read request if there is still queued data in the queue for the device. The fabric 818 may then send the data for the device from the identified next non-empty queue 822 to the FC-MAC 812. The FC-MAC 812 may then send the data in FC packets through port 0 onto the FC-AL 702 to the device. In one embodiment, the scheduler may return a "last packet" signal when there is only one packet in the queue 822 for the device. This signal allows the FC-MAC 812 to advance to the next non-empty queue (if any) without having to perform another read request to determine that the current queue is empty.

When the device receives the FC packets, it will identify the packets as being addressed to it and accept the packets, and will not pass the packets to the next device on the FC-AL 702. If the device currently has data for network switch 810 (e.g. FC packets to be sent to a device on network 700), then the device may send the data in outgoing FC packets to FC-MAC 812 concurrent with receiving the incoming FC packets from FC-MAC 812. Thus, the FC-AL 702 may be utilized in full-duplex mode when the FC-MAC 812 opens a device on the FC-AL 702.

In one embodiment, data in a queue 822 may go "stale" after a certain amount of time and be garbage collected. It may occur that, when the FC-MAC 812 sends a read request to the scheduler to send packets from a previously identified next non-empty queue 822, the data in the queue may have been garbage collected since the queue was identified as non-empty through the query interface 814. If this occurs, then the scheduler may return an empty queue signal to the FC-MAC 812 through the packet request interface 816. This is to prevent the FC-MAC 812 from waiting to receive data from a queue 822 that was previously identified as non-empty but has, in the meantime, become empty.

The following is a description of one embodiment of the operation of a device on the FC-AL 702 opening the FC-MAC 812 in full-duplex mode. The device that opens the FC-MAC 812 typically has data to be sent to the network switch 810 in one or more FC packets. When opened by a device on the FC-AL 702, the FC-MAC 812 may not use query interface 814 to identify a next non-empty queue 822. Instead, the FC-MAC 812 knows which device has opened it, and the FC-MAC 812 sends a read request for data for the device that opened it to scheduler 820 through the packet request interface 816. In one embodiment, the scheduler 820 may return an acknowledgement to the FC-MAC 812 in response to the read request if there is currently queued data for the device in a queue 822 associated with the device. In one embodiment, if there is currently no queued data for the device, then the scheduler 820 may return an empty queue signal to FC-MAC 812 through packet request interface 816. In one embodiment, the scheduler may return a "last packet" signal if there is only one packet queued for the device.

If there is currently data for the device in the queue 822 associated with the device, the fabric 818 may send the data to the FC-MAC 812. The FC-MAC 812 may then transmit the data in FC packets through port 0 onto the FC-AL 812 to the device. Outgoing FC packets may be transmitted by the device to the FC-MAC 812 on the FC-AL 702 concurrent with the FC-MAC 812 transmitting the incoming FC packets to the device on the FC-AL 702. Thus, unlike prior art network switches, embodiments of network switch 810 may utilize the FC-AL 702 in full-duplex mode more efficiently when a device on the FC-AL 702 opens the network switch 810.

When the device receives the incoming FC packets from the FC-MAC 812, it will identify the packets as being addressed to it and accept the packets, and will not pass the packets to the next device on the FC-AL 812.

In one embodiment, there may be a plurality of queues 822 assigned to a device on the FC-AL 702 for queuing incoming packets for the device. This embodiment may be used with an FC-AL 702 with only one device (other than network switch 810) connected. In this embodiment, the plurality of queues 822 for the device may be serviced using priority scheduling, round robin, or other arbitrary schemes.

Embodiments of network switch 810 may be used in multiport switches. In some embodiments of a multiport switch, the hardware as illustrated in FIG. 9 may be replicated for each port. In other embodiments, portions of the hardware may be shared among a plurality of ports. For example, one embodiment may replicate the FC-MAC 812, query interface 814, and packet request interface 816, but may share a common fabric 818. Another embodiment may share a memory among the plurality of ports in which the queues 822 may be comprised, and the rest of the hardware may be replicated for each port. Each port of a multiport switch may couple to a separate FC-AL. Embodiments of 2-, 4-, 8- and 16-port switches are contemplated, but other embodiments may include other numbers of ports and/or switches. Embodiments of multiport switches where a portion of the ports interface to other data transport protocols (e.g. Ethernet, Gigabit Ethernet, SCSI, etc.) are also contemplated.

Figure 10A:
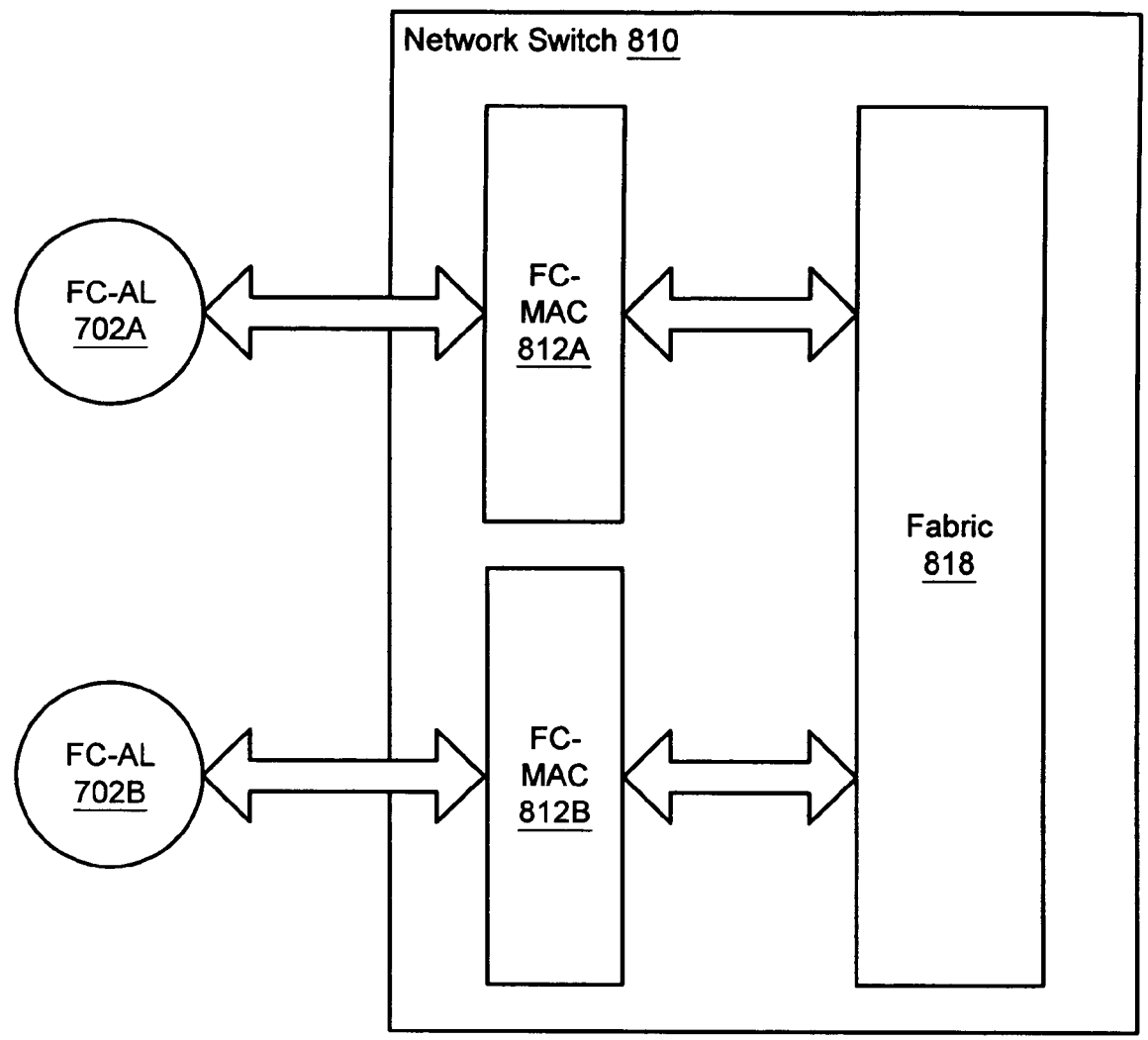
FIG. 10A is a block diagram illustrating one embodiment of a multiport switch with multiple Fibre Channel ports.

FIG. 10A is a block diagram illustrating an embodiment of a 2-port switch with FC-MAC 812A coupled to FC-AL 702A and FC-MAC 812B coupled to FC-AL 702B. The two FC-MACs 812 share a common fabric 818. Note that each FC-MAC 812 may be associated with a different set of queues 822 in fabric 818. In one embodiment, there may be one scheduler 820 shared among the FC-MACs 812. In another embodiment, there may be one scheduler 820 for each FC-MAC 812.

Figure 10B:
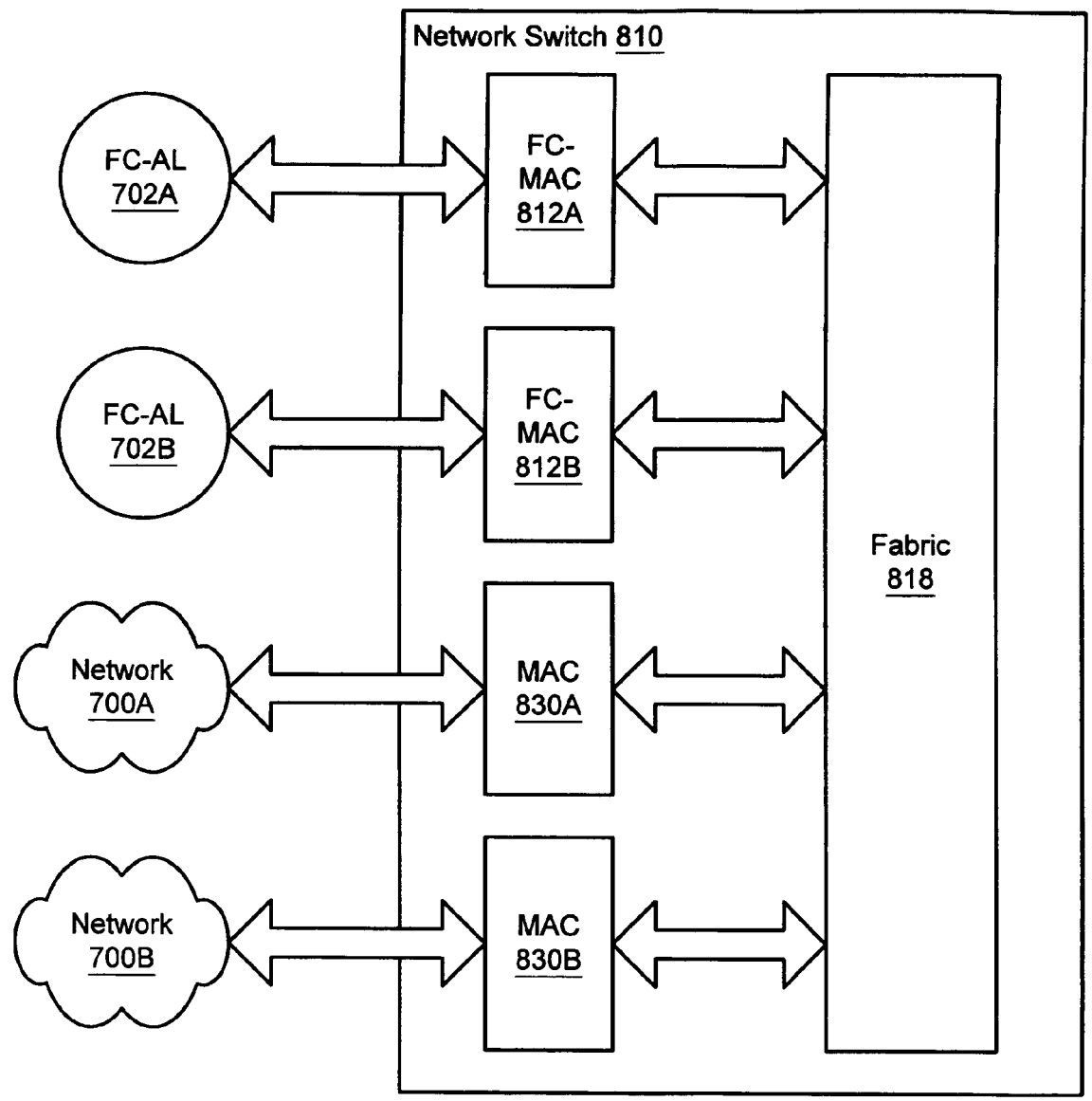
FIG. 10B is a block diagram illustrating one embodiment of a multiport switch with multiple ports that provide interfaces to Fibre Channel and other data transport protocols.

FIG. 10B is a block diagram illustrating an embodiment of a multiport switch with two FC-MAC 812 ports and two MACs 830 that provide interfaces to other data transport protocols. For example, MAC 830A may interface to Gigabit Ethernet, and MAC 830B may interface to SCSI. In one embodiment, network switch 810 may implement SoIP to facilitate communications between a plurality of data transport protocols. More information on embodiments of a network switch incorporating SoIP and supporting a plurality of protocols may be found in the United States Patent Application titled "METHOD AND APPARATUS FOR TRANSFERRING DATA BETWEEN IP NETWORK DEVICES AND SCSI AND FIBRE CHANNEL DEVICES OVER AN IP NETWORK" (Ser. No. 09/500,119) that was previously incorporated by reference.

Figure 11:
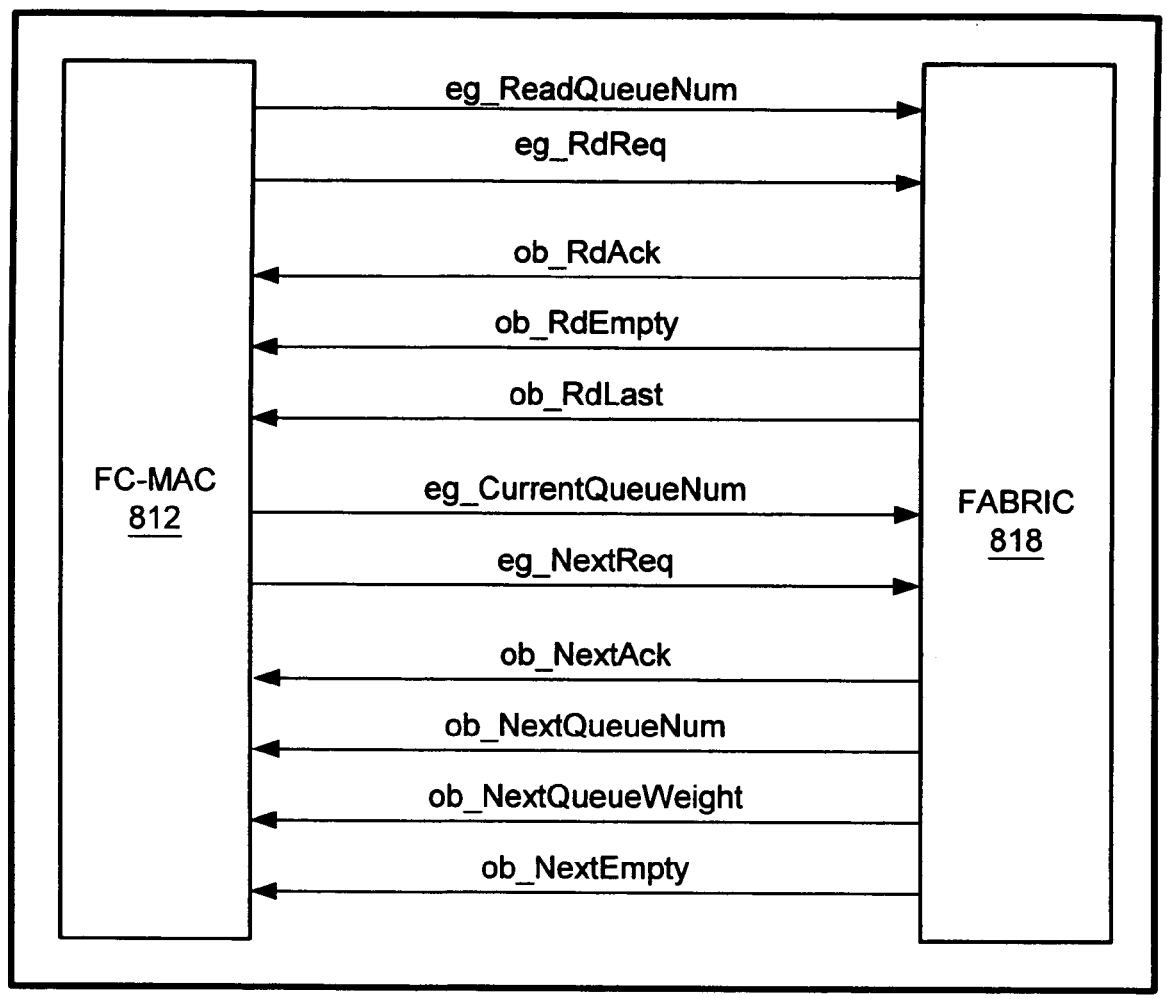
FIG. 11 is a block diagram illustrating an interface between a Fibre Channel Media Access Control (FC-MAC) and the fabric in one embodiment of a network switch.

FIG. 11 is a block diagram illustrating an interface between a Fibre Channel Media Access Control (FC-MAC) 812 and a fabric 818 according to one embodiment of a network switch 810. The signals illustrated in FIG. 11 are listed and described in the table of FIG. 12.

In one embodiment, the FC-MAC 812 may perform the actual scheduling of data frames (i.e. packets) that are to be output to the FC-MAC 812 from the Fabric 818 using a READ_QUEUE interface that consists of the first 5 signals listed in FIG. 12. The FC-MAC 812 may only request frame(s) to be read when the FC-MAC 812 knows that the requested frame(s) can be transmitted on the attached FC-AL. For example, the FC-MAC 812 may have been opened by a device on the FC-AL in full-duplex mode and have positive credit.

A second interface allows the FC-MAC 812 to gain information about the next queue in fabric 818 that may be scheduled by providing a current queue number (e.g. eg_CurrentQueueNum from the table of FIG. 12) to the fabric 818. Fabric 818 may then reply with a next queue number (e.g. ob_NextQueueNum from the table of FIG. 12). In one embodiment, the fabric 818 may select the next nonempty queue in a round-robin fashion from the specified current queue. For example, if the current queue is 64 and queues 10 and 43 are nonempty, the fabric 818 will return 10. As another example, if the current queue is 64 and queues 10, 43 and 95 are nonempty, the fabric 818 returns a queue number of 95. In one embodiment, the fabric 818 may also return an assigned weight for the next queue for use by the FC-MAC 812 in determining how long data from this queue can be output. In one embodiment, if all of the possible next queues are empty, the fabric 818 may return a signal to notify the FC-MAC 812 that there is no non-empty queue. In one embodiment, the current queue may be returned as the next queue to signal that there is no non-empty queue available.

In one embodiment, the FC-MAC 812 may request another frame to be read while a frame is in the process of being read. If a read request is received while a frame is being read, the fabric 818 may delay the assertion of ob_RdAck until the reading of the previous frame is complete. In one embodiment, the fabric 818 does not perform any scheduling functions other than to identify the "Next" queue which is based solely on whether a queue is empty or not. For example, the fabric 818 may not adjust the queue weights.

Figure 13:
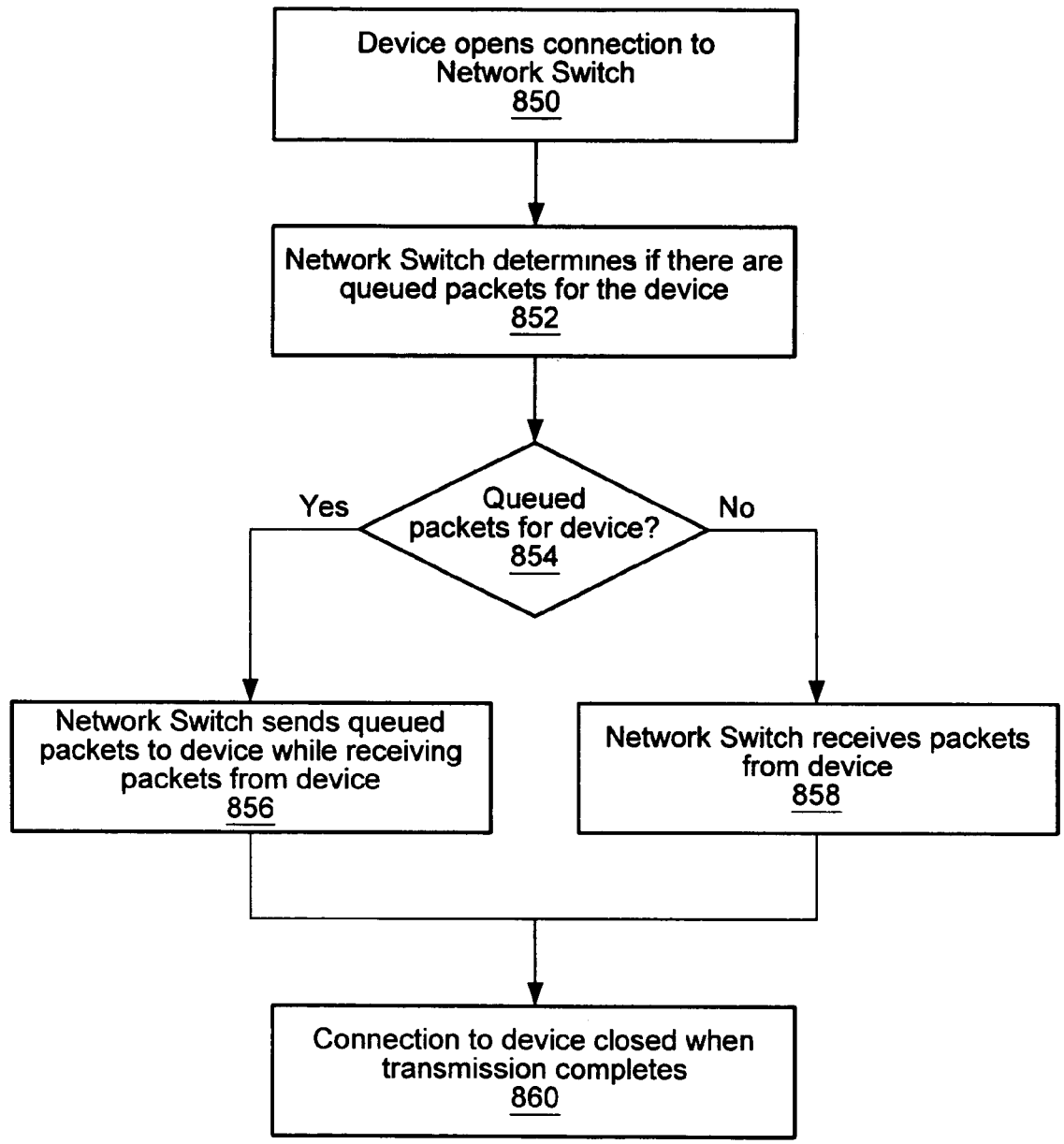
FIG. 13 is a flowchart illustrating one embodiment of a method of achieving full-duplex transmission between a network switch and a device coupled to an FC-AL when the device opens the network switch.

FIG. 13 is a flowchart illustrating one embodiment of a method of achieving full-duplex transmission between a network switch 810 and a device coupled to an FC-AL 702 when the device opens the network switch 810. The device first arbitrates for the FC-AL. As indicated at 850, when the device gains control of the FC-AL, it opens a connection to network switch 810.

As indicated at 852, network switch 810 determines if there are queued packets for the device. First, the network switch 810 detects that the device has opened it. The network switch may then use the device information to determine if there are queued incoming packets in a queue associated with the device as indicated at 854. As indicated at 856, if there are queued incoming packets for the device, then network switch 810 may send the queued packets to the device. Simultaneously, the network switch may receive outgoing packets from the device and subsequently retransmit the packets to a destination device. Thus the FC-AL may be utilized in full-duplex mode if there are incoming packets for a device when the device opens the network switch 810 to transmit outgoing packets.

As indicated at 858, if there are no queued packets for the device, network switch 810 receives the outgoing packets from the device and subsequently transmits the packets to a destination device. In this event, the FC-AL is being utilized in half-duplex mode. As indicated at 860, the connection between the device and the network switch 810 may be closed when transmission of outgoing (and incoming, if any) packets on the FC-AL is completed. Transmission may be completed when all data has been sent or when an allotted time for the device to hold the loop has expired.

The method may be implemented in software, hardware, or a combination thereof. The order of method may be changed, and various steps may be added, reordered, combined, omitted, modified, etc. For example, at 856, the network switch may receive a portion or all of the outgoing packets from the device prior to sending queued incoming packets to the device, or alternatively may send a portion or all of the queued incoming packets to the device prior to receiving outgoing packets from the device.

High Jitter Scheduling

A "High Jitter" scheduling algorithm is described that may be used to improve the utilization of bandwidth on arbitrated loops such as Fibre Channel Arbitrated Loops (FC-ALs). Prior art network switches typically have a single queue for holding frames to be output to the arbitrated loop. The order of frames on the queue determines the order in which frames are output to the arbitrated loop and hence the ordering of arbitration-open-close cycles which need to be performed. Under some conditions, such as when frames destined for two or more devices are interleaved in the queue, the loop utilization may be less than optimal. The overhead for opening and closing devices may reduce the utilization of the loop bandwidth, for example, by 10–30% depending on average frame sizes.

Frame transmit scheduling logic used in prior art devices such as network switches that carry IP (Internet Protocol) traffic are typically designed to generate traffic (e.g. packet or frame flow) with low jitter. Thus, these network switches attempt to interleave traffic from different sources as much as possible. Therefore, a high jitter scheduling algorithm for a network switch is described that may be particularly useful when interfacing an arbitrated loop such as an FC-AL with an IP network that carries low-jitter traffic. The algorithm for this purpose may be referred to as a "high jitter" algorithm to distinguish it from the "low jitter" scheduling algorithms normally used by network switches. "High jitter" includes the notion of burst transmitting groups of frames to devices. Thus, the device may receive the frames in groups, and the groups may be temporally spaced apart.

Figure 4A:
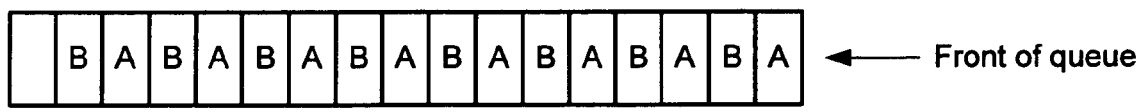
FIG. 4A illustrates a non-optimal ordering of queued frames destined to devices in an arbitrated loop in a prior art network switch.
Figure 4B:
FIG. 4B illustrates a more optimal ordering of queued frames destined to devices in an arbitrated loop.
Figure 5:
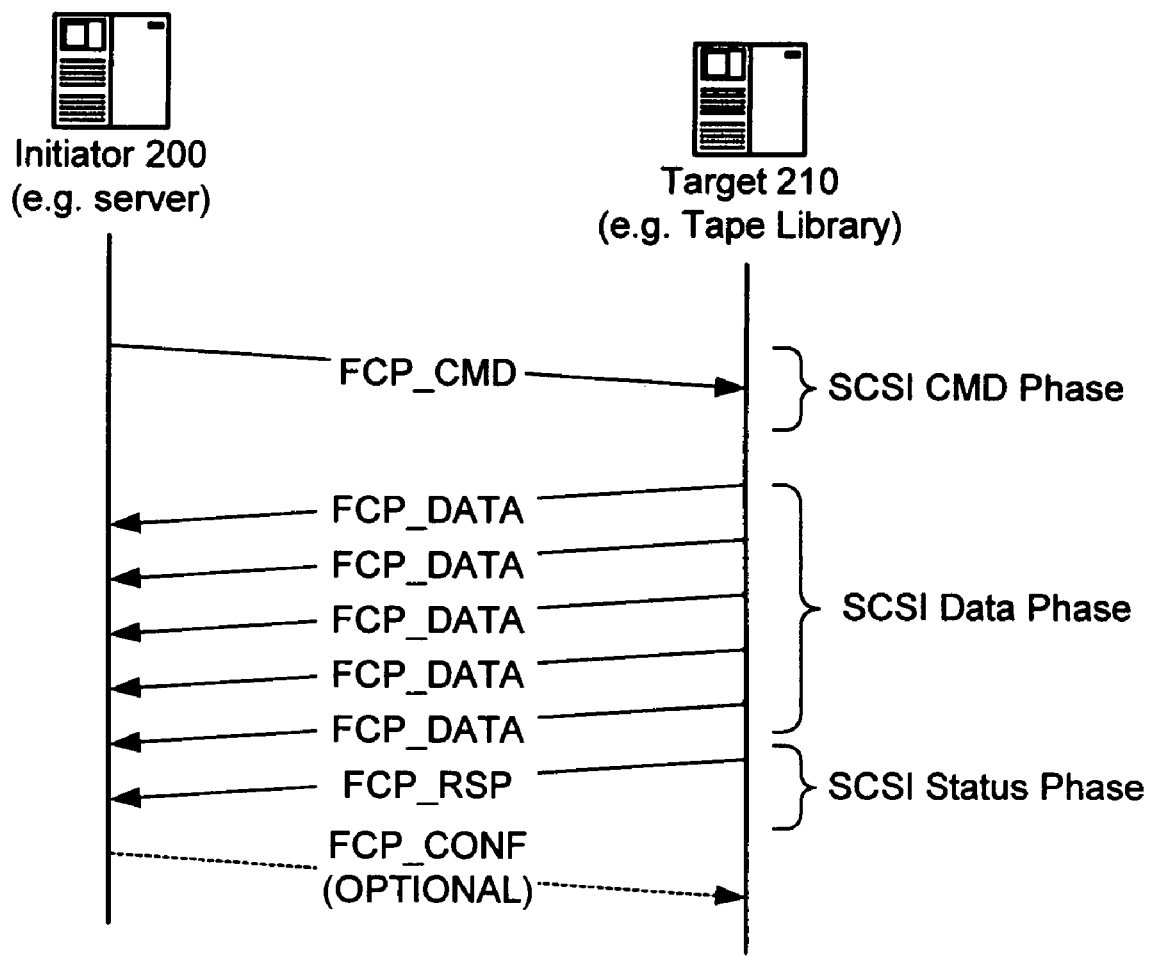
FIG. 5 illustrates an example of the processing of an FCP Read command.
Figure 6:
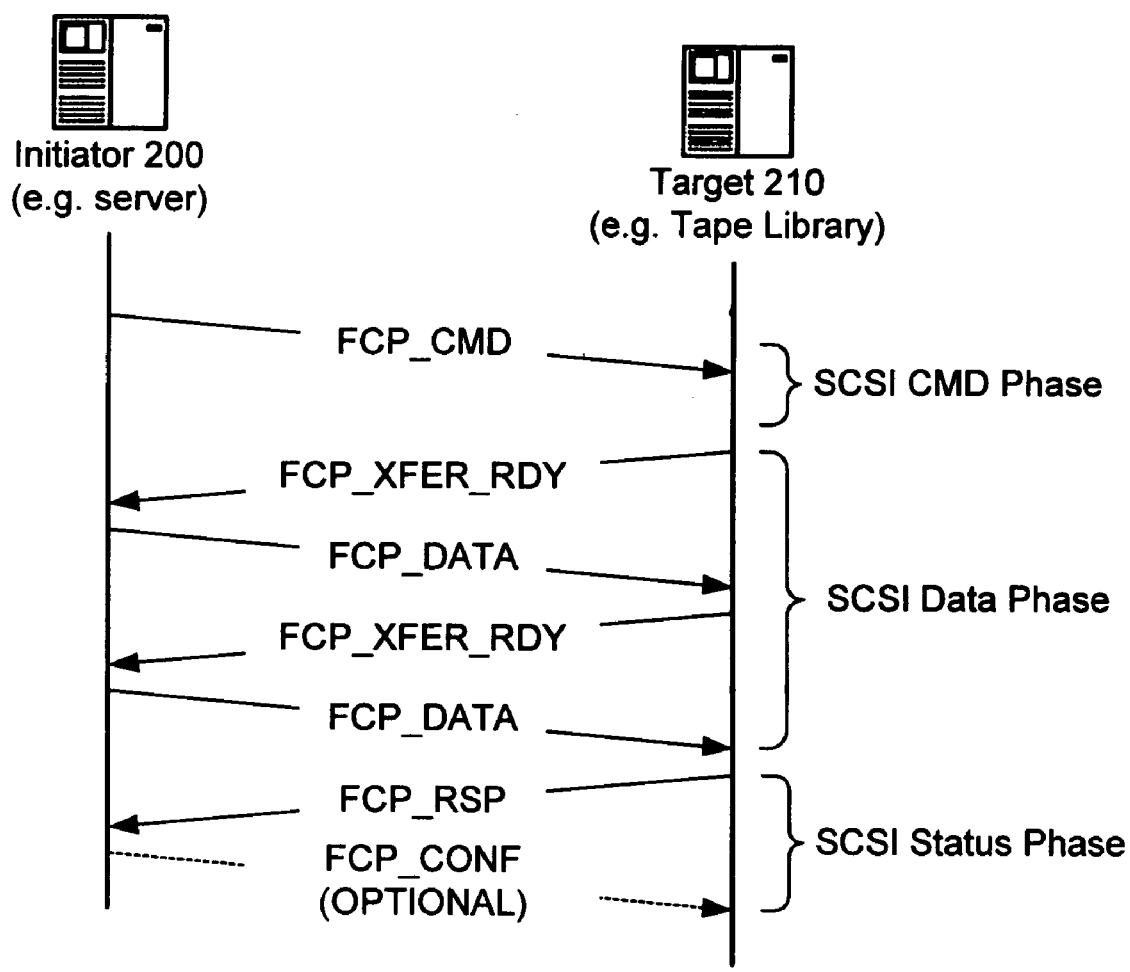
FIG. 6 illustrates an example of the processing of an FCP Write command.
Figure 7:
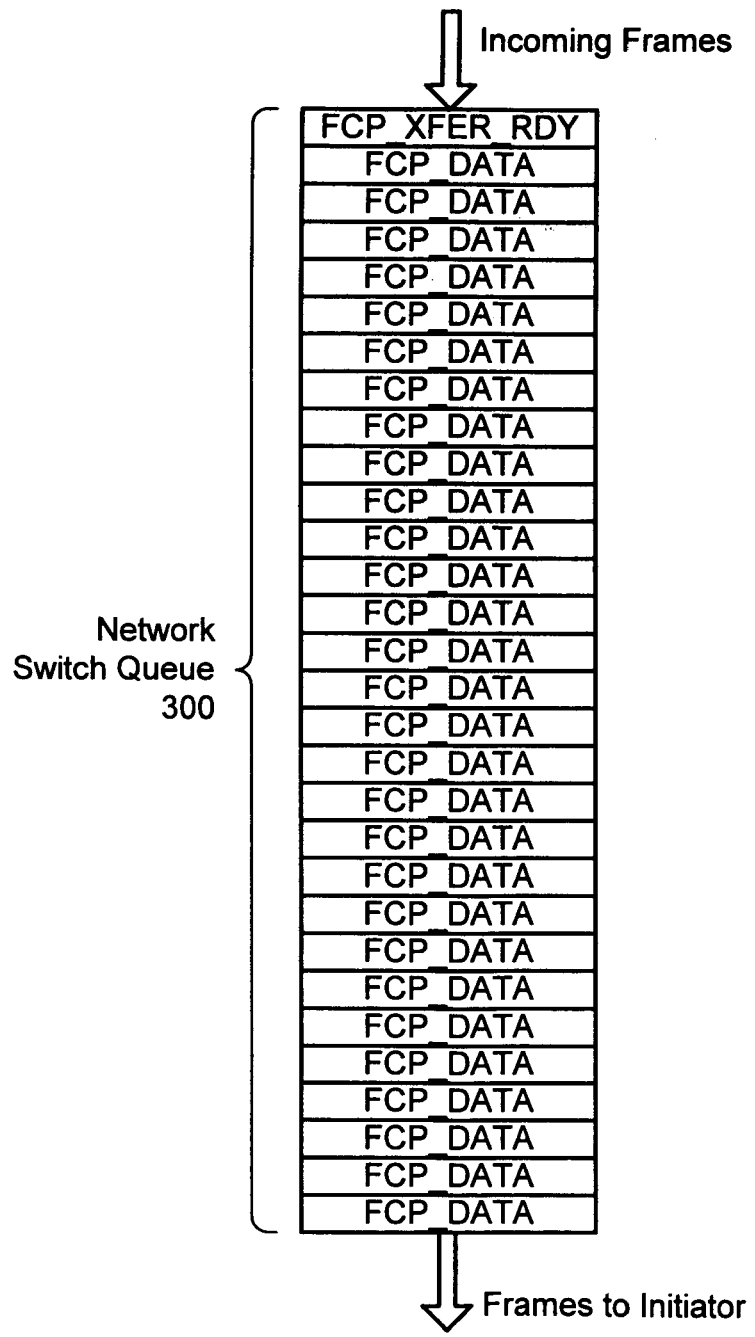
FIG. 7 illustrates how XFER_RDY information units (IUs) can be delayed due to network switch queuing.

The high jitter algorithm may use a separate queue for each device on the arbitrated loop. Therefore, for an FC-AL, the network switch may implement 126 separate output queues for possible devices on the arbitrated loop. Note that, in embodiments that also implement transfer ready reordering as described below, additional queues may be used for the high-priority scheduling of XFER_RDY packets. Frames are entered on a queue based on the frame's destination (device) address. The effect of separate queues is that received frames have now been effectively reordered when compared to prior art single-queue implementations such as those illustrated in FIGS. 4A and 4B. The scheduling algorithm may then forward frames to the arbitrated loop port (and thus device) from a specific queue for a programmed limit (also referred to as weight). Programmed limits that may be used include, but are not limited to, a programmed period of time, a programmed amount of data (e.g. in words), or a programmed number of frames. In one embodiment, the queue weights for all the queues may be programmed with the same value. In one embodiment, the queues may be assigned individual, possibly different weights. In one embodiment, instead of having programmed limits, the limits may be hard-coded (i.e. not changeable).

Figure 14:
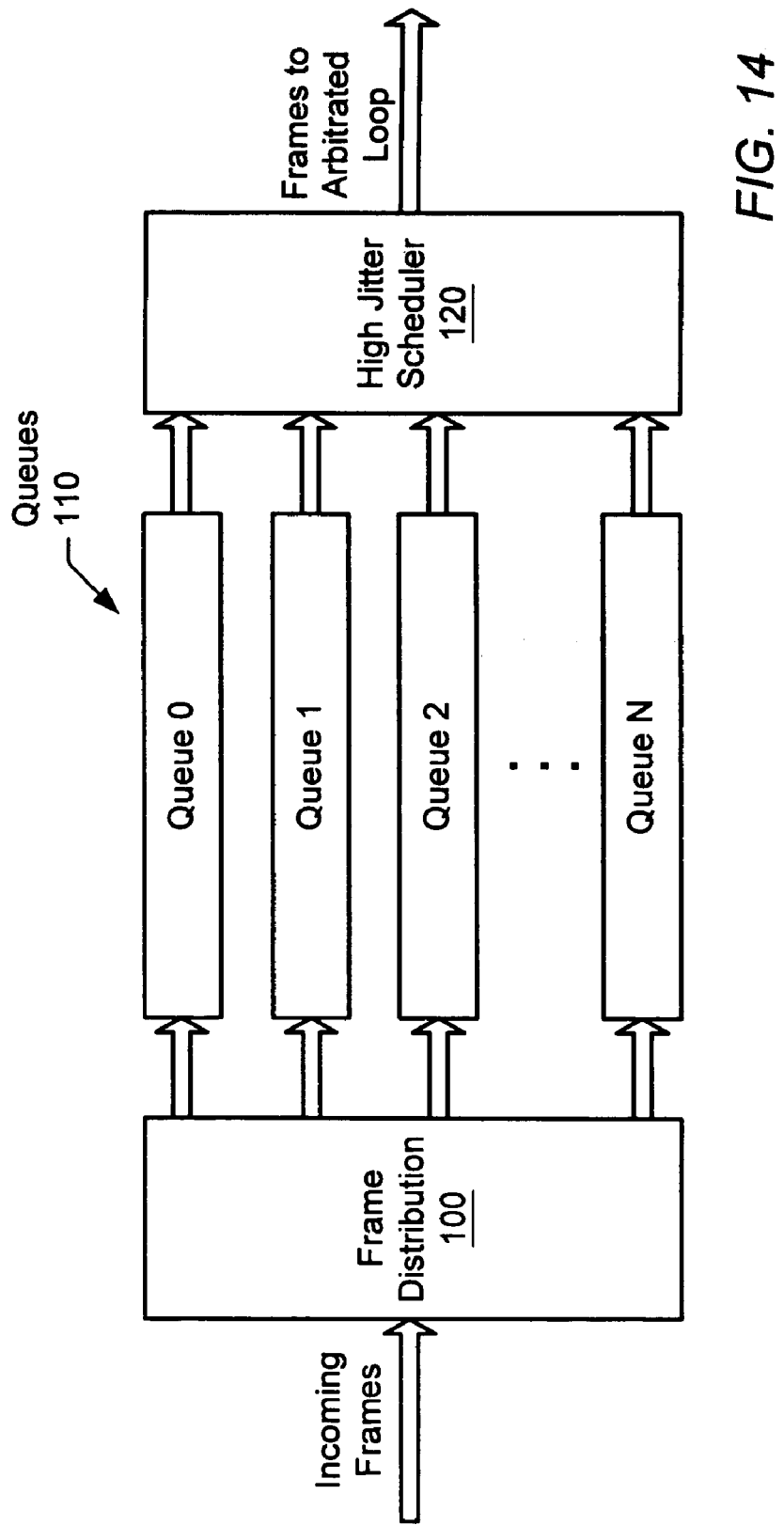
FIG. 14 is a block diagram illustrating an implementation of high jitter scheduling for an arbitrated loop such as an FC-AL within a network switch according to one embodiment.

FIG. 14 is a block diagram illustrating an implementation of high jitter scheduling for an arbitrated loop such as an FC-AL within a network switch according to one embodiment. Embodiments may also be used in devices that interface arbitrated loops to networks, for example, a device for bridging FC-ALs to an Ethernet network or other IP-compatible networks.

Referring to FIG. 14, N is the total number of queues 110, and in one embodiment is equal to the possible number of devices on the arbitrated loop so that a queue exists for each of the possible devices on the arbitrated loop. For example, in an FC-AL, N may be 126, since it is possible to connect a maximum of 126 devices in an FC-AL. The frame distribution logic 100 may direct received frames onto each queue 110 based on a device or port identifier associated with the frame. For example, for FC-AL frames, the lower 8 bits of the Fibre Channel destination identifier (D_ID) may specify the arbitrated loop physical address (AL_PA). Thus, each queue may hold only data frames associated with a single arbitrated loop device for the destination port. In one embodiment, the high jitter frame scheduler 120 then forwards frames from the queues in a round robin fashion. Each queue is sequentially checked to see if it has data frames. If the queue has data frames, the frame scheduler 120 may forward frames from this queue until the programmed limit (i.e. the weight) is reached. Note that this programmed "weight" may be specified as frames, words (or some word multiple), or a length of time. Other parameters may be used as limits. The frame scheduler 120 may then check for the next queue with available data and forward frames from that queue until its "weight" is met. The scheduler 120 may continue checking each queue until it reaches the last queue when it repeats the process beginning with the first queue. Methods of servicing the queues with a high jitter scheduler 120 other than the round-robin method as described above are possible and contemplated.

In one embodiment, if weights are defined in time or words, once forwarding of a frame has started, the complete frame must be forwarded. Several methods for dealing with the case when the weight expires in the middle of a frame are possible and contemplated. In one embodiment, the scheduler may remember the amount of time or words used after the weight expired and reduce the queue's weight when it is next scheduled. In another embodiment, the queue may be given its programmed weight when next scheduled.

In the following example, a common weight of 8 packets is assigned. A queue 4 has 12 packets (labeled A), queue 33 has 6 packets (labeled Y) and queue 50 has 20 packets (labeled Z). All other queues are currently empty. The following is the order of the packets that may be output by the scheduler (assuming it starts scheduling with queue 0):

AAAAAAAA YYYYYY ZZZZZZZZ AAAA ZZZZZZZZ ZZZZ

The packet labels on the left are forwarded first (8 packets labeled A from queue 4 are forwarded first). Thus, the frames are output in bursts, reducing the overhead for opening and closing connections.

In one embodiment, the high jitter scheduling algorithm may be implemented with fewer queues than the possible number of devices on the loop based on the assumption that arbitrated loops may actually have less than the possible number of devices. In this embodiment, multiple devices may be assigned to each queue. Generally, in this embodiment, if X is the possible number of devices on the loop, and Y is the number of devices assigned to each queue, then N (the total number of queues 110) is equal to X/Y. For example, in one embodiment wherein the arbitrated loop supports 126 possible devices, 64 queues may be implemented, and each queue may be assigned up to 2 devices (64=126/2). In this embodiment, performance may be affected on the loop only if the number of devices actually on the loop exceeds N. Note that, even if the number of devices exceeds N, performance still may be improved when compared to prior art embodiments that do not use high jitter scheduling.

Figure 15A:
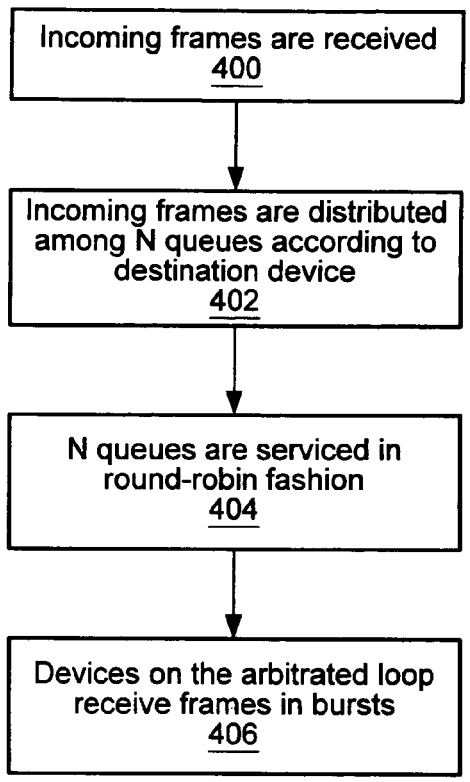
FIG. 15A is a flowchart illustrating a method of implementing high jitter scheduling according to one embodiment.
Figure 15B:
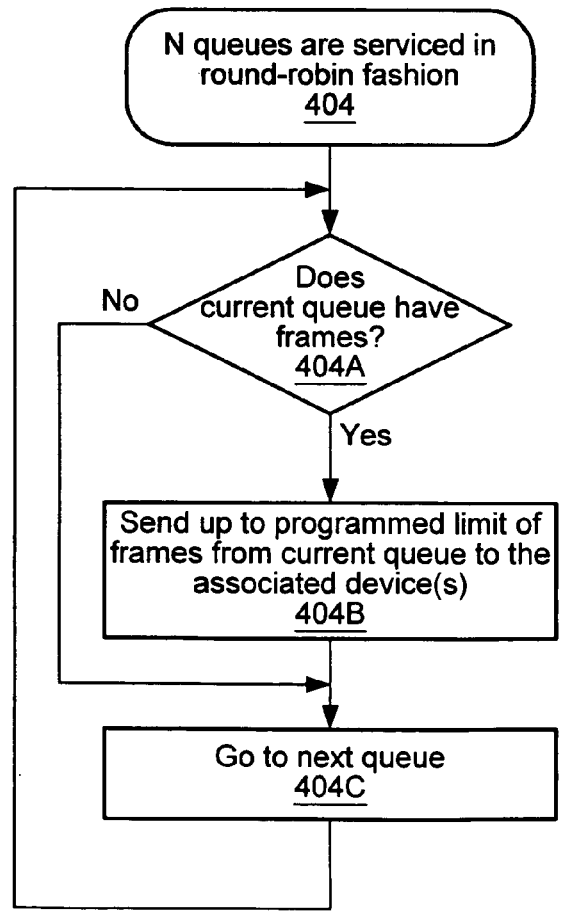
FIG. 15B is a flowchart illustrating the round robin servicing of queues according to one embodiment.

FIGS. 15A and 15B are flowcharts illustrating a method of implementing high jitter scheduling according to one embodiment. A network switch may receive a plurality of incoming frames as indicated at 400. Frame distribution logic 100 may distribute the frames among the N queues 110 on the network switch as indicated at 402. For example, each frame may include information identifying the particular device and/or port on the arbitrated loop to which it is destined. The frame distribution logic may use this information to add the frame to the queue associated with the device and/or port. In one embodiment, each device on the arbitrated loop may be associated with its own queue. In another embodiment, multiple devices (e.g. 2) may be associated with each queue.

As indicated at 404, a high jitter scheduler 120 may be servicing the N queues 110, in this embodiment using a round-robin servicing method. Other embodiments may employ other queue servicing method. In the round-robin method, the scheduler 120 starts at a first queue (e.g. the queue associated with device 0), checks to see if the queue currently holds any frames and, if so, sends one or more of the frames from the queue to the destination device(s) of the frames. Thus, a device on the arbitrated loop may receive frames in bursts (e.g. groups of two or more frames received close together in time with wider time gaps between the groups) as indicated at 406. In other words, interleaved frames that were received by the network switch are sent to the destination devices on the arbitrated loop in a non-interleaved order.

FIG. 15B expands on 404 of FIG. 15A and illustrates the round robin servicing of the queues 110 according to one embodiment. The high jitter scheduler 120 checks to see if the current queue has frames as indicated at 404A. If the current queue does have frames, then the high jitter scheduler 120 may forward frames from the queue to the destination device(s) of the frames as indicated at 404B. In one embodiment, the scheduler 120 may service a particular queue for a programmed limit, also referred to as a weight. Programmed limits that may be used include, but are not limited to, a programmed period of time, a programmed amount of data (e.g. in words), or a programmed number of frames. Upon reaching the programmed limit, or if the current queue does not have frames as determined at 404A, the scheduler 120 goes to the next queue 404C and returns to 404A.

The methods as described in FIGS. 15A and 15B may be implemented in software, hardware, or a combination thereof. The order of method may be changed, and various steps may be added, reordered, combined, omitted, modified, etc. Note that one or more of 400, 402, 404 and 406 of FIG. 15A may operate in a pipelined fashion. In other words, one or more of 400, 402, 404 and 406 may be performed concurrently on different frames and/or groups of frames being transmitted from one or more initiators (transmitters) to one or more target devices (receivers).

Transfer Ready (XFER_RDY) Reordering

In a Storage Area Network (SAN), a host bus adapter, e.g. a Fibre Channel host bus adapter, may be connected to a network switch performing a mixture of read/write transfers to multiple storage devices such as disk drives. Under some conditions, the write performance may be considerably lower than the read performance. While read performance under these conditions is typically as expected, write performance may be considerably less than expected. When only write operations are performed, the performance for the write operations is typically as expected. The reduced write performance during combined read and write operations may be the result of a large buffer within the network switch that caused the delivery of transfer ready (XFER_RDY) frames to be delayed when both write and read operations are being performed.

FCP (Fibre Channel Protocol for SCSI) uses several frame sequences to execute a SCSI command between the initiator of a command (the initiator) and the target of the command (the target). An example of an initiator is a host bus adapter such as a Fibre Channel host bus adapter and an example of a target is a storage device such as a disk drive. Other types of devices may serve as initiators and/or targets. The initiator and target communicate through the use of information units (IUs), which are transferred using one or more data frames. Note that an IU may consist of multiple data frames but may be logically considered one information unit. Preferably, when an initiator 200 issues a write command, the FCP DATA IU can be returned as soon as the initiator 200 receives the FCP_XFER_RDY IU from the target 210. If an initiator 200 is performing overlapping write commands (multiple outstanding write commands), it can maintain a constant flow of FCP_DATA IU frames as long as it has received at least one XFER_RDY IU for which it has not yet transmitted the data. However, if the FCP_XFER_RDY IU is delayed, the initiator 200 will not maintain a constant flow of output data when it is waiting for an XFER_RDY IU to transmit data.

When only write operations are performed, the XFER_RDY IUs may see little delay because only FCP_RSP and FCP_XFER_RDY IUs are being sent from the targets to the initiator. However, when read and write operations are performed simultaneously, the initiator 200 will also be receiving FCP_DATA IUs from the target(s) 200. Thus, the XFER_RDY IU may be significantly delayed due to queuing of data frames by network switches, and write performance may be degraded significantly when performing a combination of read and write commands. In larger networks, write performance may be degraded when XFER_RDY IUs are delayed due to other traffic, and therefore the write performance degradation may not be limited to instances where an initiator 200 is performing both read and write operations.

Figure 16:
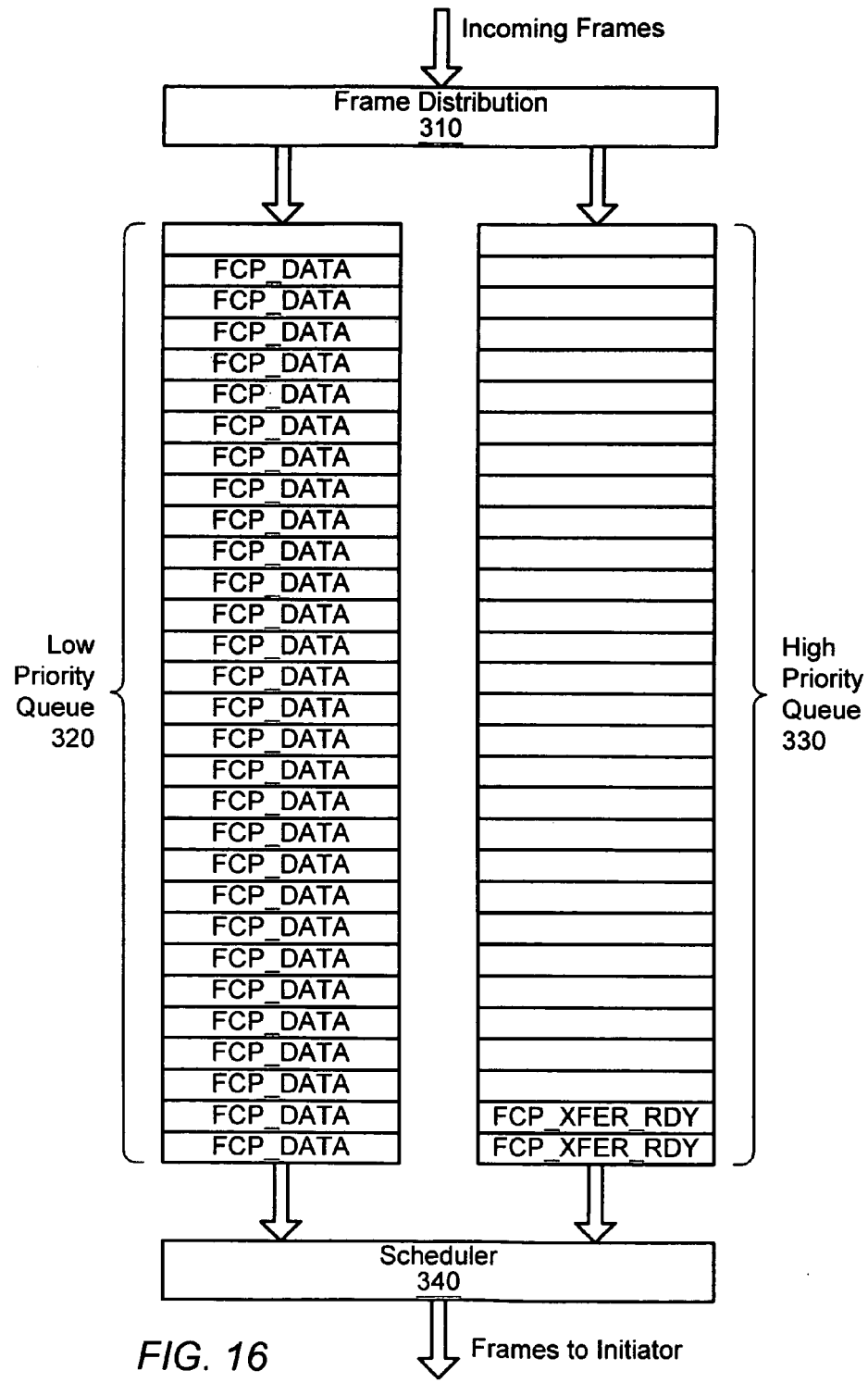
FIG. 16 illustrates transfer ready reordering through the use of one or more high priority queues according to one embodiment.

FIG. 16 illustrates transfer ready reordering through the use of one or more high priority queues according to one embodiment. In one embodiment of a network switch, an output that is connected to a Fibre Channel device may be allocated an additional queue 330 specifically for XFER_RDY frames. Frames on this queue 330 are given a higher priority than frames on the normal queue. The frame distribution logic 310 identifies XFER_RDY frames and sends these frames to the high priority queue 330, and sends other frames to low (or normal) priority queue 320. The scheduler logic 340 forwards frames from the XFER_RDY Queue 330 before frames on the low priority queue 320. Thus, in this embodiment, XFER_RDY frames may be forwarded with lower latency than frames on queue 320. The frames on queue 320 may be (read) data IUs each comprising a portion of read data requested in one or more data read command IUs previously sent from the initiator device to the target device. The XFER_RDY frames on queue 330 are transfer ready IUs sent by a target device to an initiator device and specify that the target device is ready to receive write data from the initiator device as specified in one or more data write command IUs previously sent from the initiator device to the target device.

While the Fibre Channel specifications do not explicitly require in-order delivery of frames, Fibre Channel storage device implementations may expect in-order delivery of frames to simplify their logic design. However, the reordering of XFER_RDY frames may still be performed since there are no side effects as there may be if reordering of other information units (e.g. FCP_CMND frames) is performed.

Transfer ready reordering through the use of high-priority queuing may be performed for other protocols than FCP that carry SCSI commands and use a response from the target to elicit the initiator to transmit the write data. For example, the iSCSI protocol may use a similar method as FCP except that the target requests write data using an RTT (Ready To Transfer) protocol data unit.

Transfer ready reordering through the use of high-priority queuing may be implemented in devices that interface initiators 200 to the network (e.g. a network switch, bridge, gateway or router). Other devices in the network may also implement transfer ready reordering through the use of high-priority queuing.

In one embodiment, a single queue may be used to implement transfer ready reordering through the use of high-priority queuing if the queue implementation allows the insertion of data frames at arbitrary points within the queue. For example, a linked list queue implementation may allow the XFER_RDY frames to be inserted at the front of the queue. However, the ordering of XFER_RDY frames is preferably maintained.

In some embodiments, transfer ready reordering through the use of high-priority queuing may also be implemented for protocols that rely on TCP or TCP-like protocols for data transport such as iFCP, iSCSI or FCIP. Protocols that rely on TCP or TCP-like protocols may maintain a buffer of data that has been transmitted but not acknowledged. This data is typically saved until the receiver acknowledges the data in the event that retransmission of the data (or a portion thereof) is necessary. In addition, a buffer of data waiting to be transmitted may also be maintained. In these embodiments, a single buffer may be used with pointers indicating the location of data not yet transmitted. The XFER_RDY (or equivalent) data frames are preferably not forwarded ahead of data already transmitted. However, in one embodiment, the XFER_RDY (or equivalent) data frames may be forwarded ahead of data waiting to be transmitted.

Figure 17A:
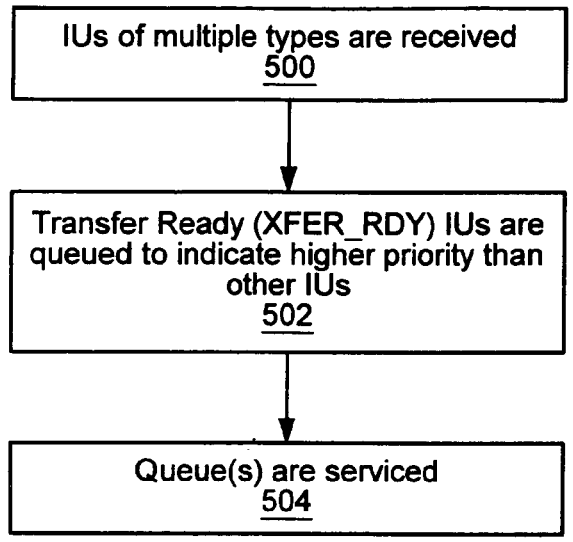
FIG. 17A is a flowchart illustrating transfer ready reordering according to one embodiment.
Figure 17B:
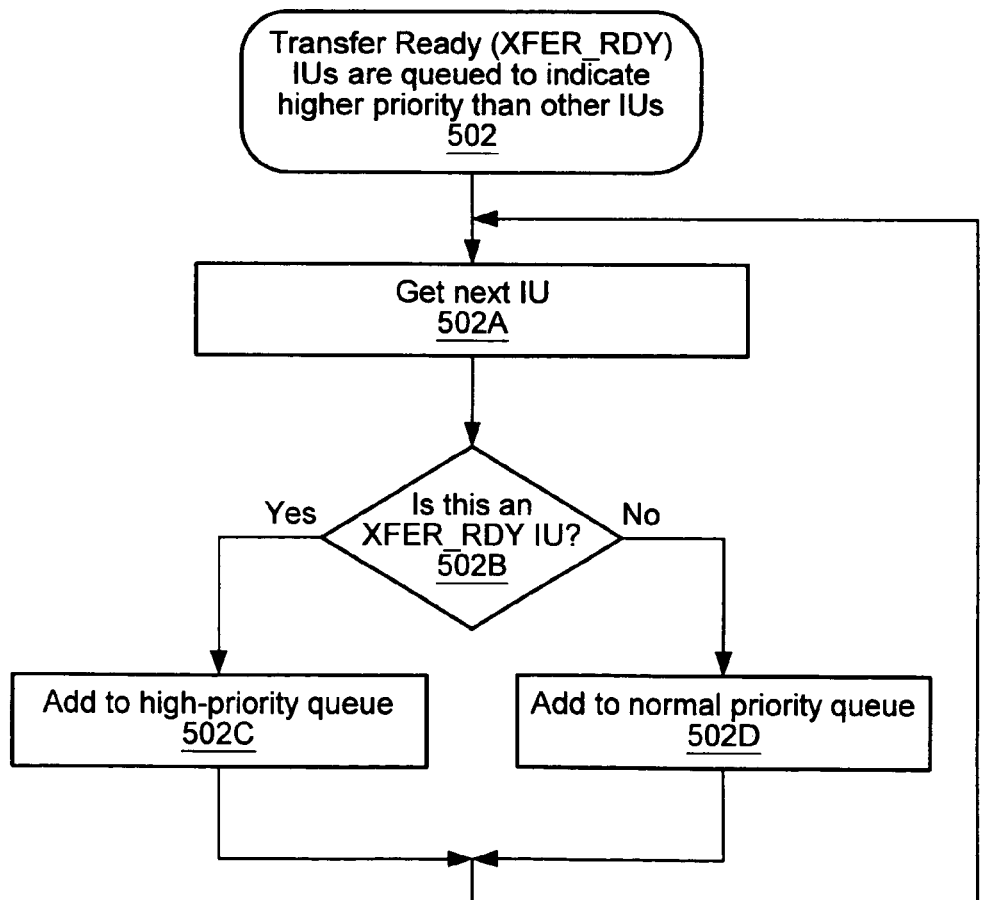
FIG. 17B is a flowchart illustrating a method of transfer ready reordering that queues XFER_RDY IUs to a separate, higher priority queue than the other IUs according to one embodiment.
Figure 17C:
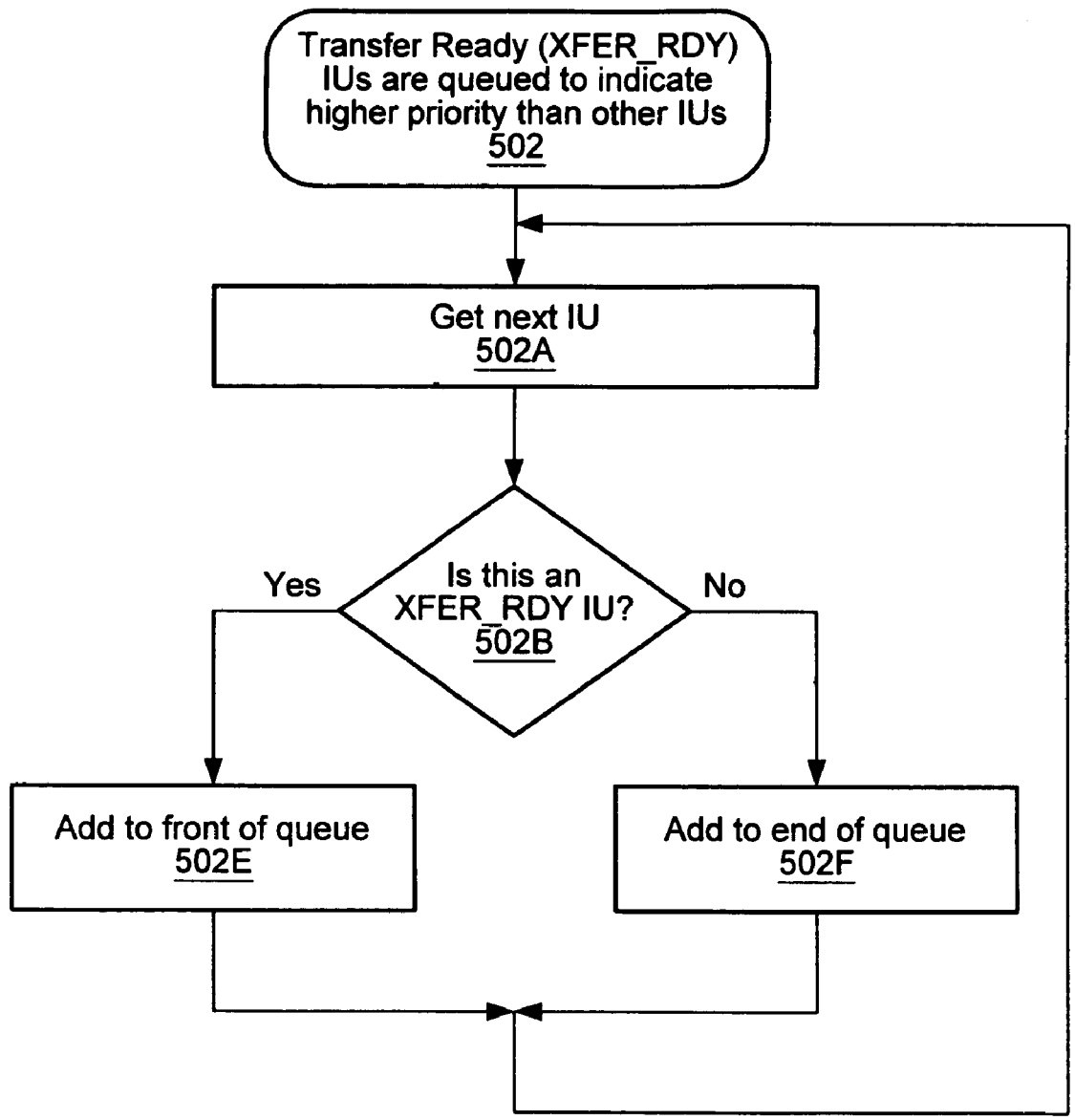
FIG. 17C is a flowchart illustrating a method of transfer ready reordering that inserts XFER_RDY IUs at the head of a queue with other IUs in the queue according to one embodiment.

FIGS. 17A through 17C are flowcharts illustrating methods of implementing transfer ready reordering according to various embodiments. At 500, a device may receive one or more information units (IUs) of different types, e.g. the several types of IUs for FCP as described above. Transfer ready (XFER_RDY) IUs in the received IUs may be distributed to one or more queues (e.g. by frame distribution logic 310) in a manner to indicate that the XFER_RDY IUs are to be handled at a higher priority than non-XFER_RDY IUs as indicated at 502.

FIG. 17B illustrates one embodiment of a method for queuing transfer ready IUs to indicate higher priority than other IUs, and expands on 502 of FIG. 17A. In this embodiment, the XFER_RDY IUs may be queued by the frame distribution logic 310 to a separate, higher priority queue than the other IUs. A next IU may be received as indicated at 502A. The IU may be examined as indicated at 502B. If this is an XFER_RDY IU, then the IU may be added to a higher-priority queue as indicated at 502C. If this is not an XFER_RDY IU, then the IU may be added to a normal priority queue as indicated at 502D. 502A–502D may be repeated for all incoming IUs.

In one embodiment, there may be a plurality of "normal" priority queues, with each queue associated with one or more possible devices (e.g. ports) on the arbitrated loop, and the incoming non-XFER_RDY IUs may be added to the queue associated with the IU's target device. In one embodiment with a plurality of normal priority queues, there may be a plurality of higher-priority queues, with each higher-priority queue associated with one of the normal priority queues. In this embodiment, an XFER_RDY IU may be added to the higher-priority queue associated with the target device of the IU. In another embodiment, there may be a single normal priority queue and a single higher-priority queue, all non-XFER_RDY IUs may be added to the normal priority queue, and all XFER_RDY IUs may be added to the higher priority queue. One skilled in the art will recognize that other combinations of normal- and higher-priority queues may be implemented within the scope of the invention.

FIG. 17C illustrates another embodiment of a method for queuing transfer ready IUs to indicate higher priority than other IUs, and expands on 502 of FIG. 17A. In this embodiment, a single queue may be used if the queue implementation allows the insertion of data frames at arbitrary points within the queue. A next IU may be received as indicated at 502A. The IU may be examined as indicated at 502B. If this is an XFER_RDY IU, then the IU may be added to the front of the queue as indicated at 502E to facilitate the high priority scheduling of the XFER_RDY IUs. In one embodiment, to ensure that the XFER_RDY IUs are handled in the order received, the XFER_RDY IUs may be added to the queue behind any already queued XFER_RDY IUs. If this is not an XFER_RDY IU, then the IU may be added to the end of the queue as indicated at 502F.

In one embodiment, there may be a plurality of queues, with each queue associated with one or more possible devices (e.g. ports) on the arbitrated loop, the non-XFER_RDY IUs may be added to the end of the queue associated with the IU's target device, and the XFER_RDY IUs may be added to the front of the queue associated with the IU's device. Alternatively, there may be a single queue used for all devices. One skilled in the art will recognize that other queue configurations may be implemented within the scope of the invention.

Returning now to FIG. 17A, at 504, the one or more queues may be serviced by the scheduler 340. In embodiments using separate higher-priority queues for XFER_RDY IUs as described in FIG. 17B, the higher-priority queue for one or more devices may be serviced at a higher priority than the normal-priority queue for the one or more devices. In one embodiment where there are multiple queues with each normal priority queue associated with one or more devices and with a separate higher-priority queue also associated with the one or more devices, the queues may be serviced in a round-robin fashion. When it is a particular queue's "turn", the higher-priority queue may be checked and, if any XFER_RDY IUs are queued, the IUs may be forwarded to the target device(s). After the XFER_RDY IUs are forwarded, the normal priority queue may be checked and, if present, one or more IUs of other types may be forwarded to the target device(s). In one embodiment, when one or more IUs are added to the one or more higher-priority queues, servicing of the one or more normal priority queues may be suspended to allow the received one or more XFER_RDY IU to be forwarded to their one or more destination devices. One skilled in the art will recognize that other methods of servicing the normal- and higher-priority queues to provide reordering of the IUs and thus to forward the XFER_RDY IUs at a higher priority than other IUs may be implemented within the scope of the invention.

In embodiments using one or more queues where XFER_RDY IUs are inserted at the head of the queue(s) as illustrated in FIG. 17C, when the queue is serviced as indicated at 504, the IUs will be retrieved (e.g. popped off) the front of the queue, and thus any XFER_RDY IUs will be forwarded before any other types of IUs on the queue. In embodiments where there are a plurality of queues, with each queue associated with one or more possible devices (e.g. ports) on the arbitrated loop, the non-XFER_RDY IUs may be added to the end of the queue associated with the IU's target device, and the XFER_RDY IUs may be added to the front of the queue associated with the IU's device. In these embodiments, the queues may be serviced in a round-robin fashion. Thus, when one of the queues is serviced as indicated at 504, the IUs will be popped off the front of the queue, and thus any XFER_RDY IUs will be forwarded to their target device(s) before any other types of IUs on the queue are forwarded.

The methods as described in FIGS. 17A–17C may be implemented in software, hardware, or a combination thereof. The order of method may be changed, and various steps may be added, reordered, combined, omitted, modified, etc. Note that one or more of 500, 502, and 504 of FIG. 17A may operate in a pipelined fashion. In other words, one or more of 500, 502, and 504 may be performed concurrently on different groups of IUs being transmitted from one or more initiators (transmitters) to one or more target devices (receivers).

Various embodiments may further include receiving, sending or storing instructions and/or data implemented in accordance with the foregoing description upon a carrier medium. Generally speaking, a carrier medium may include storage media or memory media such as magnetic or optical media, e.g., tape, disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

In summary, a system and method for allowing a network switch to transmit queued packets to a device when opened by the device, and thus to utilize the Fibre Channel Arbitrated Loop (FC-AL) in full-duplex mode when possible, as well as embodiments of methods for scheduling packets to improve performance, have been disclosed. While the embodiments described herein and illustrated in the figures have been discussed in considerable detail, other embodiments are possible and contemplated. It should be understood that the drawings and detailed description are not intended to limit the invention to the particular forms disclosed, but on the contrary, the intention is to cover all modifications, equivalents, and alternatives falling within the spirit and scope of the present invention as defined by the appended claims.

What is claimed is:

1. A method comprising:
 a first device coupled to a Fibre Channel Arbitrated Loop (FC-AL) opening a network switch coupled to the FC-AL;
 the first device transmitting a first one or more Fibre Channel (FC) packets to the network switch on the FC-AL subsequent to said opening; and
 the network switch responding to the first device opening the network switch by transmitting at least part of a second one or more FC packets to the first device on the FC-AL at substantially the same time that the first device is transmitting the first one or more FC packets to the network switch on the FC-AL; wherein the network switch further comprises:
  a memory queuing incoming FC packets destined for one or more devices on the FC-AL; and
  data transport logic for:
   receiving a connection request from the first device of one or more devices on the FC-AL;
   determining if there are incoming FC packets for the first device queued in the memory in response to the connection request from the first device;
   issuing a read request to the memory for queued incoming FC packets for the first device; if there are queued incoming FC packets in the memory, receive an acknowledgement signal from the memory so indicating; and if there are no queued incoming FC packets in the memory, receive an empty queue signal from the memory so indicating; and
   in response to said determining that there are incoming FC packets for the first device queued in the memory, transmitting one or more of the incoming FC packets for the first device queued in the memory to the first device.

2. The method as recited in claim 1, wherein the FC-AL is operating in full-duplex data transfer mode during the network switch transmitting the at least part of a second one or more FC packets to the first device on the FC-AL at substantially the same time that the first device is transmitting the first one or more FC packets to the network switch on the FC-AL.

3. The method as recited in claim 1, wherein the network switch includes a buffer operable to queue FC packets to be sent to the first device, the method further comprising:
 determining that the buffer has one or more FC packets to be sent to the first device in response to said opening the network switch;
 wherein the second one or more PC packets are from the buffer, and wherein said transmitting the second one or more FC packets to the first device on the FC-AL is performed in response to said determining that the buffer has the one or more FC packets.

4. The method as recited in claim 1, wherein the network switch includes a plurality of buffers operable to queue FC packets to be sent to a plurality of devices coupled to the FC-AL, wherein a first of the plurality of buffers is associated with the first device, and wherein the second one or more PC packets are in the first buffer prior to said transmitting.

5. The method as recited in claim 1, wherein the network switch is coupled to a network, the method further comprising the network switch transmitting the first one or more FC packets via the network to a second device coupled to the network subsequent to said receiving the first one or more FC packets from the first device on the FC-AL.

6. The method as recited in claim 5, wherein the network is Fibre Channel.

7. The method as recited in claim 5, wherein the network is parallel SCSI.

8. The method as recited in claim 5, wherein the network supports one of Ethernet and Gigabit Ethernet data transport protocols.

9. The method as recited in claim 5, wherein the network supports Internet Protocol (IP).

10. The method as recited in claim 5, further comprising the network switch encapsulating the first one or more FC packets into one or more larger packets of a protocol compatible with the network prior to said transmitting the first one or more FC packets to the second device.

11. The method as recited in claim 1, wherein the network switch is coupled to a network, the method further comprising the network switch receiving the second one or more FC packets via the network from a second device coupled to the network prior to said transmitting the second one or more FC packets to the first device on the FC-AL.

12. The method as recited in claim 11, wherein the network is Fibre Channel.

13. The method as recited in claim 11, wherein the network is parallel SCSI.

14. The method as recited in claim 11, wherein the network supports one of Ethernet and Gigabit Ethernet data transport protocols.

15. The method as recited in claim 11, wherein the network supports Internet Protocol (IP).

16. The method as recited in claim 11, further comprising the network switch extracting the second one or more FC packets from one or more larger packets of a protocol compatible with the network prior to said transmitting the second one or more FC packets to the first device.

17. A method comprising:
 a first device coupled to a Fibre Channel Arbitrated Loop (FC-AL) opening a network switch coupled to the FC-AL, wherein the network switch comprises:
  a plurality of buffers for queuing Fibre Channel (FC) packets for a plurality of devices including the first device coupled to the FC-AL;
  a memory for queuing incoming FC packets destined for one or more devices on the FC-AL; and
  data transport logic for:
   receiving a connection request from the first device of the one or more devices on the FC-AL;
   determining if there are incoming FC packets for the first device queued in the memory in response to the connection request from the first device;
   issuing a read request to the memory for queued incoming FC packets for the first device; if there are queued incoming FC packets in the memory, receive an acknowledgement signal from the memory so indicating; and if there are no queued incoming FC packets in the memory, receive an empty queue signal from the memory so indicating; and
   in response to said determining that there are incoming FC packets for the first device queued in the memory, transmitting one or more of the incoming FC packets for the first device queued in the memory to the first device;
   determining if a first buffer of the plurality of buffers associated with the first device has FC packets queued for the first device in response to the first device opening the network switch; and in response to said determining that the first buffer has FC packets queued for the first device, the network switch transmitting a first one or more packets of the FC packets queued for the first device in the first buffer to the first device on the FC-AL.

18. The method as recited in claim 17, further comprising: the first device transmitting a second one or more FC packets to the network switch on the FC-AL subsequent to said opening the network switch.

19. The method as recited in claim 18, wherein the network switch transmitting the first one or more FC packets to the first device on the FC-AL is performed at substantially the same time that the first device is transmitting the second one or more FC packets to the network switch.

20. The method as recited in claim 19, wherein, during the network switch transmitting the first one or more FC packets to the first device on the FC-AL at substantially the same time as the first device is transmitting the second one or more FC packets to the network switch on the FC-AL, the FC-AL is operating in full-duplex data transfer mode.

21. The method as recited in claim 17, wherein the network switch is coupled to a network, the method further comprising the network switch transmitting the first one or more FC packets via the network to a second device coupled to the network subsequent to said receiving the first one or more PC packets from the first device on the FC-AL.

22. The method as recited in claim 21, wherein the network is one of Fibre Channel, parallel SCSI, Ethernet and Gigabit Ethernet.

23. The method as recited in claim 21, wherein the network supports Internet Protocol (IP).

24. The method as recited in claim 21, further comprising converting the first one or more FC packets to a protocol compatible with the network prior to said transmitting the first one or more FC packets to the second device.

25. The method as recited in claim 17, wherein the network switch is coupled to a network, the method further comprising the network switch receiving the second one or more FC packets via the network from a second device coupled to the network prior to said transmitting the second one or more FC packets to the first device on the FC-AL.

26. The method as recited in claim 25, wherein the network is one of Fibre Channel, parallel SCSI, Ethernet and Gigabit Ethernet.

27. The method as recited in claim 25, wherein the network supports Internet Protocol (IP).

28. The method as recited in claim 25, further comprising converting data received from the second device in a protocol compatible with the network to the second one or more FC packets prior to said transmitting the second one or more FC packets to the first device.

29. A method comprising:
a network switch coupled to a Fibre Channel Arbitrated Loop (FC-AL) receiving an Open primitive signal from a first device coupled to the FC-AL;
the network switch receiving a first one or more Fibre Channel (FC) packets from the first device on the FC-AL subsequent to said opening; and
the network switch responding to said receiving the Open primitive signal from the first device by transmitting at least part of a second one or more FC packets to the first device on the FC-AL at substantially the same time as said receiving the first one or more FC packets from the first device on the FC-AL the network switch further comprising:
a memory for queuing incoming FC packets destined for one or more devices on the FC-AL and
data transport logic for:
receiving a connection request from the first device of the one or more devices on the FC-AL;
determining if there are incoming FC packets for the first device queued in the memory in response to the connection request from the first device;
issuing a read request to the memory for queued incoming FC packets for the first device; if there are queued incoming FC packets in the memory, receive an acknowledgement signal from the memory so indicating; and if there are no queued incoming FC packets in the memory, receive an empty queue signal from the memory so indicating; and
in response to said determining that there are incoming FC packets for the first device queued in the memory, transmitting one or more of the incoming FC packets for the first device queued in the memory to the first device.

30. The method as recited in claim 29, wherein the FC-AL is operating in full-duplex data transfer mode during said transmitting the at least part of a second one or more FC packets to the first device on the FC-AL at substantially the same time as said receiving the first one or more FC packets from the first device on the FC-AL.

31. The method as recited in claim 29, further comprising:
determining that there are one or more queued FC packets to be sent to the first device in response to said receiving the Open primitive signal from the first device;
wherein the second one or more FC packets are from the one or more queued FC packets, and wherein said transmitting the second one or more FC packets to the first device on the FC-AL is performed in response to said determining that there are one or more queued FC packets for the first device.

32. The method as recited in claim 29, wherein the network switch includes a plurality of buffers operable to queue FC packets to be sent to a plurality of devices coupled to the FC-AL, wherein a first of the plurality of buffers is associated with the first device, and wherein the second one or more FC packets are in the first buffer prior to said transmitting.

33. A network switch comprising:
a first Input/output (I/O) port operable to couple to a Fibre Channel Arbitrated Loop (FC-AL) and configured to:
receive data forming outgoing Fibre Channel (FC) packets from one or more devices on the FC-AL; and
convey incoming FC packets out of said network switch, wherein the incoming FC packets each have a destination that corresponds to one of the devices on the FC-AL;
a memory configured to queue the incoming FC packets destined for the one or more devices on the FC-AL;
data transport logic coupled between the first I/O port and the memory, wherein the data transport logic is configured to:
receive a connection request from a first device of the one or more devices on the FC-AL;
determine if there are incoming FC packets for the first device queued in the memory in response to the connection request from the first device;
issue a read request to the memory for queued incoming FC packets for the first device; if there are queued incoming FC packets in the memory, receive an acknowledgement signal from the memory so indicating; and if there are no queued incoming FC packets in the memory, receive an empty queue signal from the memory so indicating; and in response to said determining that there are incoming FC packets for the first device queued in the memory, transmitting one or more of the incoming FC packets for the first device queued in the memory to the first device via the first I/O port.

34. The network switch as recited in claim 33, wherein the data transport logic is further configured to receive one or more outgoing FC packets from the first device via the first I/O port subsequent to said receiving the connection request.

35. The network switch as recited in claim 33, wherein the data transport logic is further configured to send the one or more incoming FC packets to the first device and to receive the one or more outgoing FC packets from the first device in parallel.

36. The network switch as recited in claim 33, wherein the data transport logic is further configured to send the one or more incoming FC packets to the first device and to receive the one or more outgoing FC packets from the first device substantially simultaneously.

37. The network switch as recited in claim 33, wherein the data transport logic is further configured to send the one or more incoming FC packets to the first device and to receive the one or more outgoing FC packets from the first device in full-duplex data transfer mode.

38. The network switch as recited in claim 33, wherein the network switch is operable to couple to a network, wherein the network switch is further configured to transmit the one or more outgoing FC packets via the network to a second device coupled to the network subsequent to said receiving the one or more outgoing FC packets from the first device on the FC-AL.

39. The network switch as recited in claim 37, wherein the network supports Internet Protocol (IP).

40. The network switch as recited in claim 38, wherein the network switch is further configured to convert the one or more outgoing FC packets to a protocol compatible with the network prior to said transmitting the one or more outgoing FC packets via the network to the second device.

41. The network switch as recited in claim 38, wherein the network is one of Fibre Channel, parallel SCSI, Ethernet and Gigabit Ethernet.

42. The network switch as recited in claim 33, wherein the network switch is operable to couple to a network, wherein the network switch is further configured to receive the one or more incoming FC packets via the network from a second device coupled to the network prior to said transmitting the one or more incoming FC packets to the first device on the FC-AL.

43. The network switch as recited in claim 42, wherein the network is one of Fibre Channel, parallel SCSI, Ethernet and Gigabit Ethernet.

44. The network switch as recited in claim 42, wherein the network supports Internet Protocol (IP).

45. The network switch as recited in claim 42, wherein the network switch is further configured to:

receive data from the second device in a protocol compatible with the network; and convert the received data from the network protocol to the one or more incoming FC packets prior to said transmitting the one or more incoming FC packets to the first device.

46. The network switch as recited in claim 33, further comprising a second I/O port operable to couple to a network and configured to:

receive incoming data from one or more devices on the network; and convey outgoing data out of said network switch, wherein the outgoing data is destined for the one or more devices on the network.

47. The network switch as recited in claim 33, further comprising a plurality of buffers operable to queue FC packets to be sent to a plurality of devices coupled to the FC-AL, wherein a first of the plurality of buffers is associated with the first device, and wherein the second one or more FC packets are in the first buffer prior to said transmitting.

* * * * *